(12) United States Patent
Lazaro et al.

(10) Patent No.: US 11,691,581 B1
(45) Date of Patent: Jul. 4, 2023

(54) EXTENDABLE BUMPERS FOR VEHICLES

(71) Applicants: Juan A. Lazaro, San Jose, CA (US);
Erik Mikael Fermer, Partille (SE);
Alice C. Watts, Cupertino, CA (US);
Tommaso P. Rivellini, Sunnyvale, CA (US); Christian Schermaier, Sunnyvale, CA (US); John Raff, Menlo Park, CA (US); Derek C. Scott, Melbourne (AU); David E. Kingman, San Jose, CA (US); Bryce A. Woollard, Carpentersville, IL (US); Samuel G. Fowle, San Francisco, CA (US); Mark B. Rober, Cupertino, CA (US); Ibuki Kamei, Santa Clara, CA (US); Donald R. Monroe, Los Gatos, CA (US); Jesse T. Buehler, Portola Valley, CA (US); Paul D. Yeomans, Morgan Hill, CA (US)

(72) Inventors: Juan A. Lazaro, San Jose, CA (US);
Erik Mikael Fermer, Partille (SE);
Alice C. Watts, Cupertino, CA (US);
Tommaso P. Rivellini, Sunnyvale, CA (US); Christian Schermaier, Sunnyvale, CA (US); John Raff, Menlo Park, CA (US); Derek C. Scott, Melbourne (AU); David E. Kingman, San Jose, CA (US); Bryce A. Woollard, Carpentersville, IL (US); Samuel G. Fowle, San Francisco, CA (US); Mark B. Rober, Cupertino, CA (US); Ibuki Kamei, Santa Clara, CA (US); Donald R. Monroe, Los Gatos, CA (US); Jesse T. Buehler, Portola Valley, CA (US); Paul D. Yeomans, Morgan Hill, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/194,848

(22) Filed: Mar. 8, 2021

Related U.S. Application Data

(63) Continuation of application No. 16/439,843, filed on Jun. 13, 2019, now Pat. No. 10,974,688, which is a
(Continued)

(51) Int. Cl.
*B60R 19/40* (2006.01)
*B60R 21/36* (2011.01)
*B60R 19/20* (2006.01)

(52) U.S. Cl.
CPC ............ *B60R 19/40* (2013.01); *B60R 19/205* (2013.01); *B60R 21/36* (2013.01)

(58) Field of Classification Search
CPC ..... B60R 19/02; B60R 19/023; B60R 19/205; B60R 19/38; B60R 19/40
(Continued)

(56) References Cited

U.S. PATENT DOCUMENTS 2,984,512 A * 5/1961 Shaginaw ............... B60R 19/40
293/119
3,741,598 A 6/1973 Novak et al.
(Continued)

FOREIGN PATENT DOCUMENTS

CN 2637265 Y 9/2004
CN 110654334 A * 1/2020
(Continued)

*Primary Examiner* — Jason S Daniels
(74) *Attorney, Agent, or Firm* — Young Basile Hanlon & MacFarlane, P.C.

(57) ABSTRACT

An attenuation system is connected to a structural portion and includes a first portion, a second portion, and an actuator. The actuator is configured to move the attenuation
(Continued)

system between a retracted position and an extended position. The first portion is moved outward relative to the second portion during movement of the attenuation system from the retracted position to the extended position.

13 Claims, 22 Drawing Sheets

Related U.S. Application Data continuation of application No. 15/355,674, filed on Nov. 18, 2016, now Pat. No. 10,336,290.

(60) Provisional application No. 62/256,766, filed on Nov. 18, 2015.

(58) Field of Classification Search
USPC .......................................................... 293/118
See application file for complete search history.

(56) References Cited

U.S. PATENT DOCUMENTS

| | | | |
|---|---|---|---|
| 3,997,209 A * | 12/1976 | Chika | ..................... B60R 19/16 293/125 |
| 4,176,858 A | 12/1979 | Kornhauser | |
| 4,869,538 A | 9/1989 | Presley | |
| 5,646,613 A | 7/1997 | Cho | |
| 5,810,427 A | 9/1998 | Harlann et al. | |
| 6,106,038 A | 8/2000 | Dreher | |
| 6,334,639 B1 | 1/2002 | Vives et al. | |
| 9,205,792 B1 | 12/2015 | Clark | |
| 9,827,931 B2 * | 11/2017 | Farooq | .................... B60R 19/40 |
| 10,046,729 B2 | 8/2018 | Perez Garcia et al. | |
| 2003/0020289 A1 | 1/2003 | Dohrmann et al. | |
| 2005/0087998 A1 | 4/2005 | Curry et al. | |
| 2005/0230940 A1 | 10/2005 | Alexander et al. | |
| 2006/0197319 A1 | 9/2006 | Nakamura | |
| 2008/0067821 A1 | 3/2008 | Mraz | |
| 2009/0267366 A1 | 10/2009 | Vodavoz | |
| 2010/0052294 A1 | 3/2010 | Kim et al. | |
| 2012/0267183 A1 | 10/2012 | Wilmot et al. | |
| 2018/0134247 A1 * | 5/2018 | Pingston | ................. B60R 19/52 |

FOREIGN PATENT DOCUMENTS

| | | | |
|---|---|---|---|
| EP | 1088707 A1 | 4/2001 | |
| FR | 2936757 A1 * | 4/2010 | ............ B60R 19/40 |
| JP | 2000108824 A | 4/2000 | |
| WO | 9708016 A2 | 3/1997 | |

* cited by examiner

EXTENDABLE BUMPERS FOR VEHICLES

CROSS-REFERENCE TO RELATED APPLICATIONS

This application is a continuation of U.S. patent application Ser. No. 16/439,843, filed on Jun. 13, 2019, which is a continuation of U.S. patent application Ser. No. 15/355,674, filed on Nov. 18, 2016, which claims the benefit of U.S. Provisional Application No. 62/256,766, filed on Nov. 18, 2015. The contents of the foregoing applications are hereby incorporated by reference in their entireties for all purposes.

TECHNICAL FIELD

The disclosure relates generally to the field of attenuation systems.

BACKGROUND

Attenuation systems are structures that are typically positioned at the front and rear of an object. Functions performed by attenuation systems include reducing the extent of damage to a foreign body and/or the object by providing a soft initial contact, absorbing energy to prevent damage to other portions of the object during a low-speed collision, and reducing the extent of height mismatch between objects and foreign bodies of different sizes.

Attenuation systems often protrude longitudinally forward with respect to other structures such as body panels, or longitudinally rearward of other structures. In the event of a collision at the front or rear of the object, the attenuation system is often the first part of the object that is struck.

A number of attenuation systems have been utilized. A simple design includes a laterally extending metal beam that is supported forward of other structures by two or more support structures. Many modern designs include a plastic cover that conceals an underlying attenuation system that is designed to absorb impact by crushing, such as a cellular structure formed from plastic.

SUMMARY

One aspect of the disclosure is a vehicle that includes a vehicle structure and an extendable bumper system. The extendable bumper system is connected to the vehicle structure and includes a first portion, a second portion, and an actuator. The actuator is configured to move the extendable bumper system between a retracted position and an extended position. The first portion is moved outward relative to the second portion during movement of the extendable bumper system from the retracted position to the extended position.

Another aspect of the disclosure is a vehicle that includes a vehicle structure, an actuator, and a flexible fascia. The flexible fascia is moved, by the actuator, between a retracted position and an extended position by flexing relative to a nominal position.

Another aspect of the disclosure is a vehicle that includes a pivot joint, an actuator, and a bumper. The bumper is connected to the pivot joint and moved, by operation of the actuator, between a retracted position and an extended position by pivoting around the pivot joint.

BRIEF DESCRIPTION OF THE DRAWINGS

The detailed description makes reference to the accompanying drawings, wherein like reference numerals refer to like parts through several views.

DETAILED DESCRIPTION

This disclosure relates to extendable bumper systems for vehicles. Moving a bumper from a retracted position to an extended position changes the location of initial contact during a collision relative to other parts of the vehicle, such as external body panels and internal structure members. By allowing movement to the retracted position, the bumpers of the vehicle need not be positioned at all times at locations selected based on criteria such as collision performance. For example, the bumpers can be disposed in retracted positions when the vehicle is parked to reduce the overall length of the vehicle.

Figure 1:
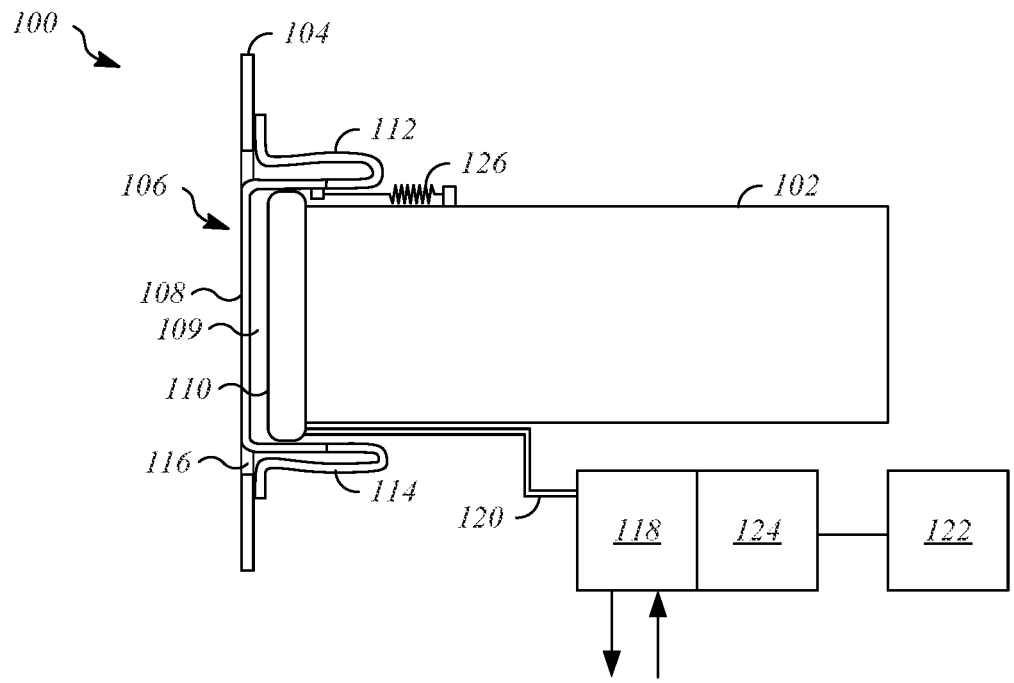
FIG. 1 is a side view illustration showing a portion of a vehicle including an extendable bumper system according to a first example in a retracted position.
Figure 2:
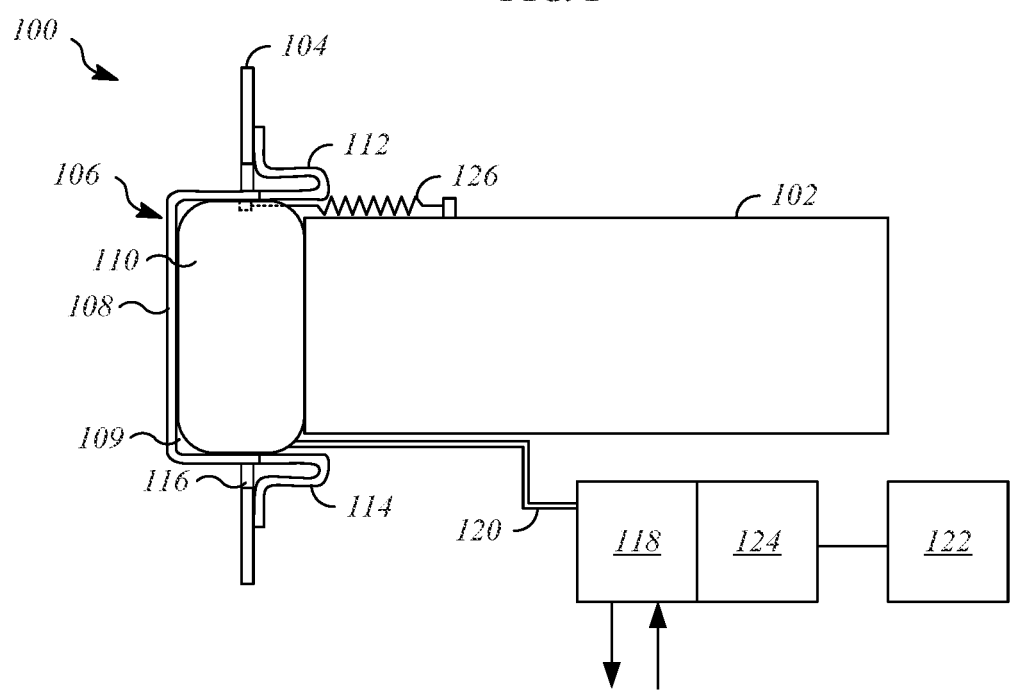
FIG. 2 is a side view illustration showing a portion of a vehicle including an extendable bumper system according to the first example in an extended position.

FIGS. 1-2 shows portions of a vehicle 100 that includes a vehicle structure 102 and a body portion 104. The vehicle structure 102 in this example is an internal structural member of the vehicle 100 that supports the body portion 104 and can support other portions of the vehicle 100 such as suspension components and drivetrain components. As examples, the vehicle structure 102 can be all of or a portion of a frame, a subframe, a unibody, or a monocoque. The body portion 104 can be an external panel of the vehicle 100. The body portion 104 can be a unitary part or can be an assembly of multiple parts. In the illustrated example, the body portion 104 is positioned at the longitudinal front of the vehicle 100.

The vehicle 100 includes an extendable bumper system 106. At least a portion of the extendable bumper system 106 is able to move between a retracted position (FIG. 1) and an extended position (FIG. 2). The extendable bumper system 106 includes a bumper cover 108, and an inflatable structure 110. The extendable bumper system 106 can also include one or more connecting structures that connect the bumper cover 108 to one or more of the vehicle structure 102 or the body portion 104 and allow movement of the bumper cover 108 between the retracted position and the extended position. In the illustrated example, these connecting structures include a first flexible hinge 112 and a second flexible hinge 114.

The bumper cover 108 is as an elongate structure that extends laterally across a majority of the transverse width of the vehicle 100. The bumper cover 108 is an external structure that is visible from the exterior of the vehicle 100, and defines part of the external body of the vehicle 100 along with the body portion 104. In the illustrated implementation, the bumper cover 108 is positioned in an opening 116 that is defined by the body portion 104. The opening 116 can be sized complementary to the bumper cover 108, such as by having a similar shape when viewed from the front of the vehicle and being slightly larger than the bumper cover 108 to allow for motion of the bumper cover 108 relative to the opening 116.

The bumper cover 108 may be a non-expanding structure that is rigid. For example, the bumper cover 108 may have higher rigidity than the inflatable structure 110 and may have sufficient rigidity to allow motion of the bumper cover 108 is response to expansion and contraction of the inflatable structure 110 without significant deformation of the bumper cover 108.

Suitable materials for the bumper cover 108 include materials that do not deform significantly during normal use of the vehicle 100. For example, the material used for the bumper cover 108 can be selected such that the bumper cover 108 does not deform during extension and retraction of the extendable bumper system 106. As one example, rubber modified polypropylenes such as PP-EDM can be used as a material for forming the bumper cover 108. Regardless of the material selected for the bumper cover 108, the bumper cover 108 may have a geometric configuration that increases or decreases the rigidity of the bumper cover in certain areas, such as internal structural ribs (not shown).

In the retracted position, a front surface of the bumper cover 108 can be substantially aligned (e.g. flush) with respect to the body portion 104. In the extended position, the bumper cover 108 can extend longitudinally forward from the body portion 104, where the extendable bumper system 106 is positioned at the front of the vehicle 100 as in the illustrated example. In implementations where the extendable bumper system 106 is positioned at the rear of the vehicle 100, the bumper cover 108 would instead extend rearward from the body portion 104. The distance by which the bumper cover 108 extends from the body portion 104 can vary based on the needs of a given implementation, but will generally fall within a range of approximately 20 mm-160 mm.

The inflatable structure 110 is a structure that is able to increase or decrease its volumetric displacement in response to supply and removal of gas. To allow this, the inflatable structure 110 has an interior space that is sealed relative to its exterior except as otherwise described herein. The inflatable structure 110 can be formed from a flexible material such as a flexible plastic or gas-impermeable cloth. In some implementations, the material from which the inflatable structure 110 if formed is inelastic. In other implementations, the material from which the inflatable structure 110 is formed is elastic. In all of these implementations, the inflatable structure 110 can be pressurized, by resisting a further change in volume in response to introduction of additional volumes of gas into its interior, either as a result of the structural configuration and material properties of the inflatable structure 110 itself, or by virtue of by disposed within an enclosed and relatively inelastic space, such as in the hollow interior 109 of the bumper cover 108.

The inflatable structure 110 can receive gas from an external source, as will be discussed herein. Upon supply of gas, such as air, to the inflatable structure, the volume displaced by the inflatable structure 110 increases. Conversely, the volume displaced by the inflatable structure 110 can be decreased by removing gas from the inflatable structure 110.

The inflatable structure 110 is disposed adjacent to the bumper cover 108, and is positioned so that the inflatable structure is able to either directly engage or indirectly engage the bumper cover 108 such that the inflatable structure 110 can cause motion of the bumper cover 108 relative to one or both of the vehicle structure 102 and the body portion 104. In the illustrated implementation, bumper cover 108 has a u-shaped cross-section when viewed along a line that extends in the transverse direction of the vehicle 100, which defines a hollow interior 109 for the bumper cover 108. The inflatable structure 110 is disposed within the hollow interior 109 of the bumper cover 108.

The inflatable structure 110 is disposed between the bumper cover 108 and a fixed portion of the vehicle 100, such as the vehicle structure 102. For example, the inflatable structure 110 can be mounted in a fixed relationship with respect to the vehicle structure using means such as mechanical fasteners or adhesives. By disposing the inflatable structure 110 between the vehicle structure 102, which is fixed, and the bumper cover 108, which is moveable, inflation and deflation of the inflatable structure 110 causes movement of the bumper cover 108 relative to other portions of the vehicle 100 such as the vehicle structure 102.

The first flexible hinge 112 and the second flexible hinge 114 are each connected to the bumper cover 108 and the body portion 104. The first flexible hinge 112 and the second flexible hinge 114 function to attach the bumper cover 108 to the body portion 104 in a manner that provides a smooth transition between the bumper cover 108 and the body portion 104. The connection of each of the first flexible hinge 112 and the second flexible hinge 114 with respect to the bumper cover 108 and the body portion 104 can be made using structures such as adhesives and/or mechanical fasteners including clips, clamps, screws or bolts. Other fastening structures could be used. Suitable materials for the first flexible hinge 112 and the second flexible hinge 114 include thermoplastic elastomers such as TPE-V and synthetic rubbers such as EPDM rubbers. The bumper cover 108 may also be supported with respect to the body portion 104 by addition components, such as components that allow the bumper cover 108 to slide linearly in the longitudinal direction of the vehicle 100 by restraining motion of the bumper cover 108 in other directions.

The first flexible hinge 112 and the second flexible hinge 114 are positioned above and below the bumper cover 108 in the illustrated implementation and are described herein as independent structures. It should be understood that the first flexible hinge 112 and the second flexible could instead be portions of a single flexible hinge that surrounds the bumper cover 108 peripherally.

The extendable bumper system can include one or more structures that are operable to urge the bumper cover 108 toward the retracted position. In some implementations, this function is performed at least in part by the first flexible hinge 112 and the second flexible hinge 114. In addition or as an alternative, the extendable bumper system can include one or more biasing elements such as one or more tension springs 126 that are connected to the bumper cover 108 and to another portion of the vehicle 100 such as the vehicle structure 102.

The extendable bumper system 106 includes components that are able to cause inflation and deflation of the inflatable structure 110. A valve assembly 118 is connected to the inflatable structure 110 by a pneumatic line 120. The valve assembly 118 includes one or more individual valves that are operable to move between open and closed positions to supply gas to or allow gas to be expelled from the interior of the inflatable structure 110. The valves incorporated by the valve assembly 118 can be electronically actuated, such as in response to signals from an electronic control unit 122, or can be pressure actuated, such as by opening in response to pressure in excess of a threshold.

The pneumatic line 120 is any structure that is able to provide fluid communication between the inflatable structure and the valve assembly 118. In the illustrated implementation, the pneumatic line 120 extends from the valve assembly 118 to the inflatable structure 110. It should be understood, however, that the fluid communication provided by the pneumatic line 120 could be provided in other ways, such as by connecting the valve assembly 118 directly to the inflatable structure 110.

A compressor 124 is operable to provide pressurized gas such as compressed air to the inflatable structure 110. The compressor 124 can be a conventional motor-driven compressor of any type, and can be driven by an integrated motor or by a motor that is part of the drivetrain of the vehicle 100. Operation of the compressor 124 can be controlled by the electronic control unit 122, such as by starting and stopping operation of the compressor 124 in response to signals from the electronic control unit 122. Flow of the pressurized gas from the compressor 124 to the inflatable structure can be controlled by the valve assembly 118.

The electronic control unit 122 is operable to cause movement of the bumper cover 108 between the extended position and the retracted position. Movement of the bumper cover 108 can be caused in response to an operating condition of the vehicle 100. As one example, the electronic control unit 122 can cause movement the bumper cover 108 from the retracted position to the extended position when the vehicle 100 is turned on, and cause movement of the bumper cover 108 from the extended position from the retracted position when the vehicle 100 is turned off. As another example, the electronic control unit 122 can cause movement of the bumper cover 108 from the retracted position to the extended position when the vehicle 100 is placed into a "drive" mode, and move the bumper cover 108 from the extended position from the retracted position when the vehicle 100 is placed into a "park" mode. As another example, the electronic control unit 122 can cause movement of the bumper cover 108 from the retracted position to the extended position when a speed of the vehicle 100 exceeds a threshold value, such as five miles per hour or eight kilometers per hour, and move the bumper cover 108 from the extended position from the retracted position when the speed of the vehicle 100 falls below the threshold value. Once moved to the extended position, the electronic control unit 122 can cause the bumper cover 108 to remain in the extended position until the operating condition changes.

To cause movement of bumper cover 108 from the retracted position to the extended position, the electronic control unit can, as an example, cause operation of the compressor 124 and cause the valve assembly to allow compressed gas to flow from the compressor 124 to the inflatable structure 110 through the pneumatic line 120. As the compressed gas enters the inflatable structure 110 the volumetric displacement of the inflatable structure 110 increases, which causes the inflatable structure 110 to expand within the hollow interior 109 of the bumper cover 108 and apply a force to the bumper cover 108 that acts in opposition to the force applied to the bumper cover 108 by the tension springs 126. As a result of the force applied to the bumper cover 108 by the inflatable structure 110, the bumper cover 108 moves toward the extended position.

To cause movement of the bumper cover 108 from the extended position to the retracted position, the electronic control unit 122 can cause the valve assembly 118 allow the pressurized gas to exit the interior of the inflatable structure. For example, the electronic control unit 122 can cause the valve assembly 118 to open one or more valves that allow the inflatable structure to communicate with atmosphere and thereby vent a portion of the pressurized gas that is present within the interior of the inflatable structure 110 to atmosphere. While the interior of the inflatable structure is in communication with a lower pressure area such as atmosphere, the pressurized gas exits the inflatable structure 110, and deflation of the inflatable structure 110 can be assisted by the force applied to the bumper cover 108 by the tension springs 126 to urge the bumper cover 108 to the retracted position. As an alternative or in addition, the electronic control unit 122 can cause the valve assembly 118 to couple the inflatable structure 110 to the compressor 124 such that vacuum pressure is applied to the inflatable structure 110 by the compressor 124 in order to remove pressurized gas from the interior of the inflatable structure 110.

Figure 3:
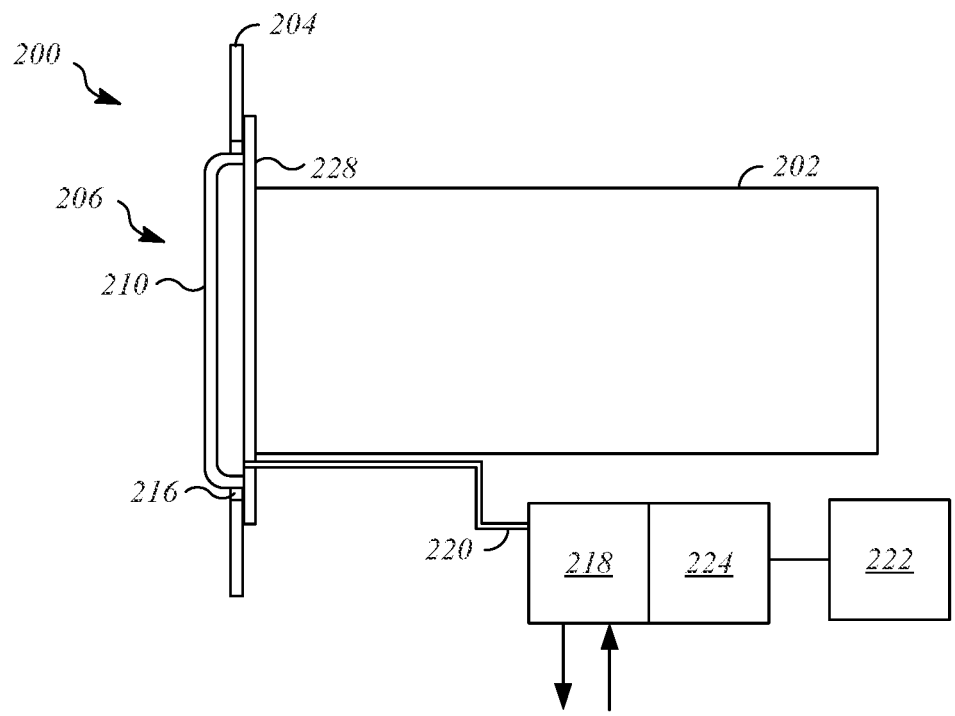
FIG. 3 is a side view illustration showing a portion of a vehicle including an extendable bumper system according to a second example in a retracted position.
Figure 4:
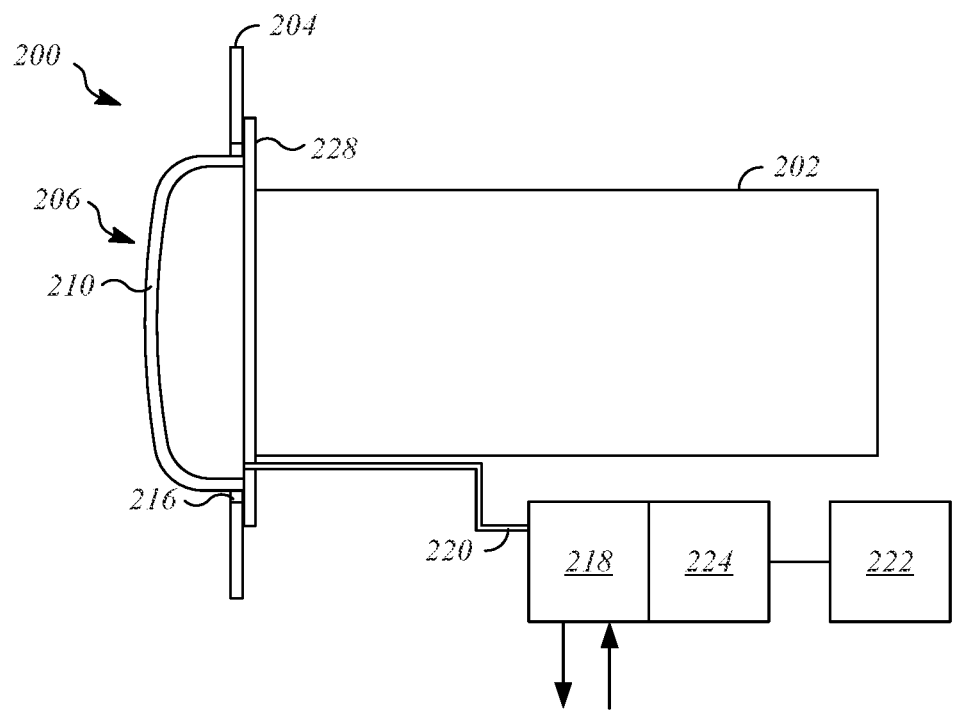
FIG. 4 is a side view illustration showing a portion of a vehicle including an extendable bumper system according to the second example in an extended position.

FIGS. 3-4 show a vehicle 200, that includes a vehicle structure 202, a body portion 204, and an extendable bumper system 206. The vehicle 200 is similar to the vehicle 100 except as otherwise described herein.

The extendable bumper system 206 includes an inflatable structure 210 that moves between a retracted position (FIG. 3) and a retracted position (FIG. 4) by inflating and deflating. The inflatable structure 210 defines a sealed interior that allows it to hold pressurized gas, similar to the structure described with respect to the inflatable structure 110. The inflatable structure 210 is formed from a material that is both flexible and elastic. Accordingly, the material from which the inflatable structure 210 is formed stretches as the inflatable structure 210 is inflated, which increases the volumetric displacement of the inflatable structure 210. Inflation of the inflatable structure 210 moves the position of the front of the inflatable structure 210 by a distance of approximately 20 mm-160 mm.

The inflatable structure 210 extends through an opening 216 that is defined by the body portion 204 of the vehicle 200. The inflatable structure 210 defines part of the exterior of the vehicle 200 (i.e., an exterior vehicle surface), and is not disposed within a bumper cover.

The inflatable structure 210 can be connected to the vehicle structure 102 and/or the body portion 204 by a mounting portion 228. In one implementation, the mounting portion 228 is formed from the same material as the inflatable structure 210, and may be formed separately or as an integral portion of the inflatable structure 210. In another implementation, the mounting portion 228 is a rigid member that defines part of the sealed interior of the inflatable structure 210 by being sealingly connected to the inflatable structure 210, such as by the mounting portion 228 being bonded to the inflatable structure 210 with and adhesive or by the mounting portion 228 being mechanically clamped to the inflatable structure 210.

The inflatable structure 210 is connected to a valve assembly 218 by a pneumatic line 220. The valve assembly 218 is connected to a source of pressurized gas such as a compressor 224. The valve assembly 218 and the compressor 224 can be controlled by an electronic control unit 222, which can be similar to the electronic control unit 122.

The inflatable structure 210 is inflated in order to move the extendable bumper system 206 to the extended position from the retracted position. To inflate the inflatable structure 210, compressed gas is supplied to the inflatable structure from the compressor 224 through the valve assembly 218 and the pneumatic line 220. Inflation of the inflatable structure 210 can be performed in response to control signals received at the valve assembly 218 and the compressor 224 from the electronic control unit 222, as explained with respect to the electronic control unit 122.

The inflatable structure 210 is deflated in order to move the extendable bumper system 206 to the retracted position from the extended position. As one example, the valve assembly 218 can vent the pressurized gas in the inflatable structure 210 to atmosphere in response to control signals from the electronic control unit 222, while the elastic material of the inflatable structure 210 contracts, which expels the pressurized gas from the interior of the inflatable structure 210. As another example, the compressor 224 can be used to evacuate the interior of the inflatable structure 210.

Figure 5:
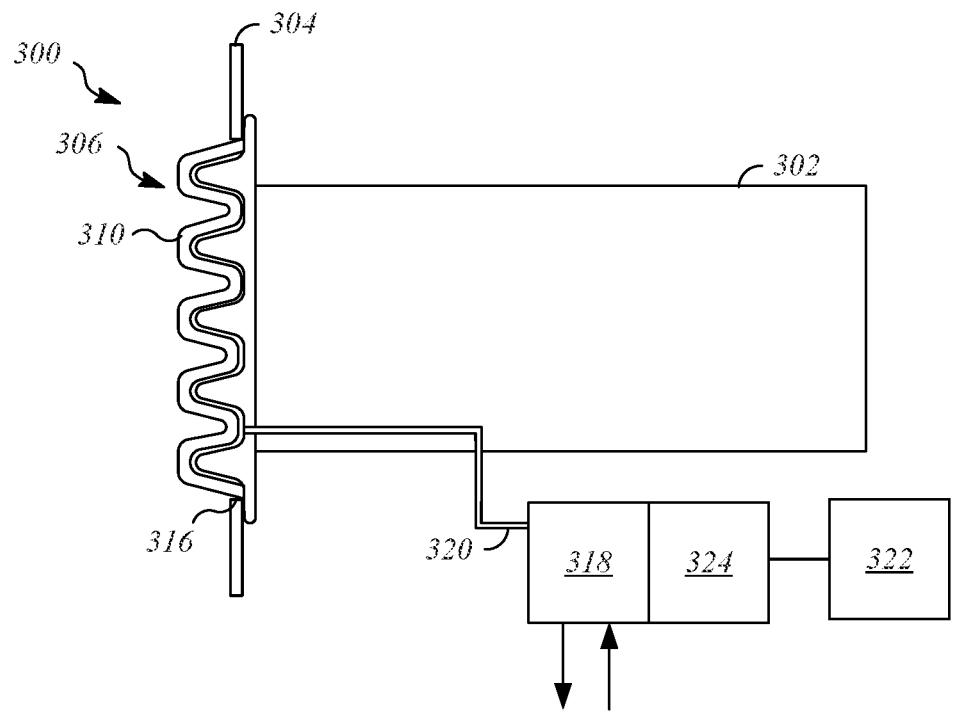
FIG. 5 is a side view illustration showing a portion of a vehicle including an extendable bumper system according to a third example in a retracted position.
Figure 6:
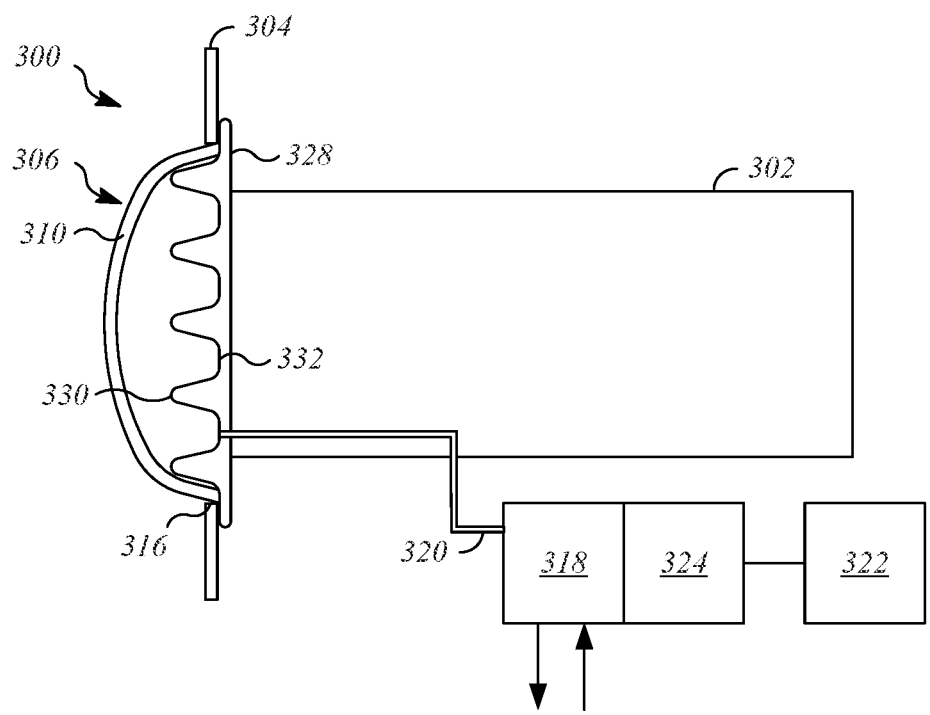
FIG. 6 is a side view illustration showing a portion of a vehicle including an extendable bumper system according to the third example in an extended position.

FIGS. 5-6 show a vehicle 300, that includes a vehicle structure 302, a body portion 304, and an extendable bumper system 306. The vehicle 300 is similar to the vehicle 200 except as otherwise described herein.

The extendable bumper system 306 includes an inflatable structure 310 that moves between a retracted position (FIG. 5) and a retracted position (FIG. 6) by inflating and deflating. The inflatable structure 310 defines a sealed interior that allows it to hold pressurized gas, similar to the structure described with respect to the inflatable structure 310. The inflatable structure 310 is formed from a material that is flexible but is inelastic. Accordingly, the material from which the inflatable structure 310 is formed inflates without stretch as the volumetric displacement of the inflatable structure 310 increases. Inflation of the inflatable structure 310 moves the position of the front of the inflatable structure 310 by a distance of approximately 20 mm-160 mm.

The inflatable structure 310 extends through an opening 316 that is defined by the body portion 304 of the vehicle 300. The inflatable structure 310 defines part of the exterior of the vehicle 300, and is not disposed within a bumper cover.

The inflatable structure 310 can be connected to the vehicle structure 302 and/or the body portion 304 by a mounting portion 328. In one implementation, the mounting portion 328 is formed from the same material as the inflatable structure 310, and may be formed separately or as an integral portion of the inflatable structure 310. In another implementation, the mounting portion 328 is a rigid member that defines part of the sealed interior of the inflatable structure 310 by being sealingly connected to the inflatable structure 310, such as by the mounting portion 328 being bonded to the inflatable structure 310 with and adhesive or by the mounting portion 328 being mechanically clamped to the inflatable structure 310. As an example, the rigid material can be a crushable material such as foam that maintains its shape during normal use but is able to crush in response to the types of forces experienced in a collision.

Because the inflatable structure 310 is formed from an inelastic material, excess material is present when the inflatable structure 310 is deflated, and the overall surface area of the inflatable structure 310 is greater than the area define d by the opening. To allow the inflatable structure to be neatly deflated, a plurality of elongate ribs 330 are formed on the mounting portion 328. The elongate ribs 330 extend in the transverse direction of the vehicle 300, which is also the long dimension of the inflatable structure 310. The elongate ribs 330 are separated from one another by a plurality of troughs 332 that are in approximate alignment with the body portion 304 in the fore to aft direction of the vehicle 300. The elongate ribs 330 extend forward relative to the troughs 332 and the body portion 304. For example, the elongate ribs 330 can extend forward from the body portion 304 by approximately half the distance by which the inflatable structure 310 extends forward from the body portion 304 when the inflatable structure 310 is in the extended position. Accordingly, the elongate ribs 330 provide additional area that the inflatable structure 310 can conform to when deflated.

The inflatable structure 310 is connected to a valve assembly 318 by a pneumatic line 320. The valve assembly 318 is connected to a source of pressurized gas such as a compressor 324. The valve assembly 318 and the compressor 324 can be controlled by an electronic control unit 322, which can be similar to the electronic control unit 122.

The inflatable structure 310 is inflated in order to move the extendable bumper system 306 to the extended position from the retracted position. To inflate the inflatable structure 310, compressed gas is supplied to the inflatable structure from the compressor 324 through the valve assembly 318 and the pneumatic line 320. Inflation of the inflatable structure 310 can be performed in response to control signals received at the valve assembly 318 and the compressor 324 from the electronic control unit 322, as explained with respect to the electronic control unit 122.

The inflatable structure 310 is deflated in order to move the extendable bumper system 306 to the retracted position from the extended position. To deflate the interior of the inflatable structure, the valve assembly 318 places the interior of the inflatable structure 310 into fluid communication with the inlet side of the compressor 324, which operates to evacuate gas from the interior of the inflatable structure 310. As the interior of the inflatable structure 310 is evacuated, the inflatable structure 310 conforms to the geometry of the elongate ribs 330 and troughs 332, thus returning to the retracted position.

Figure 7:
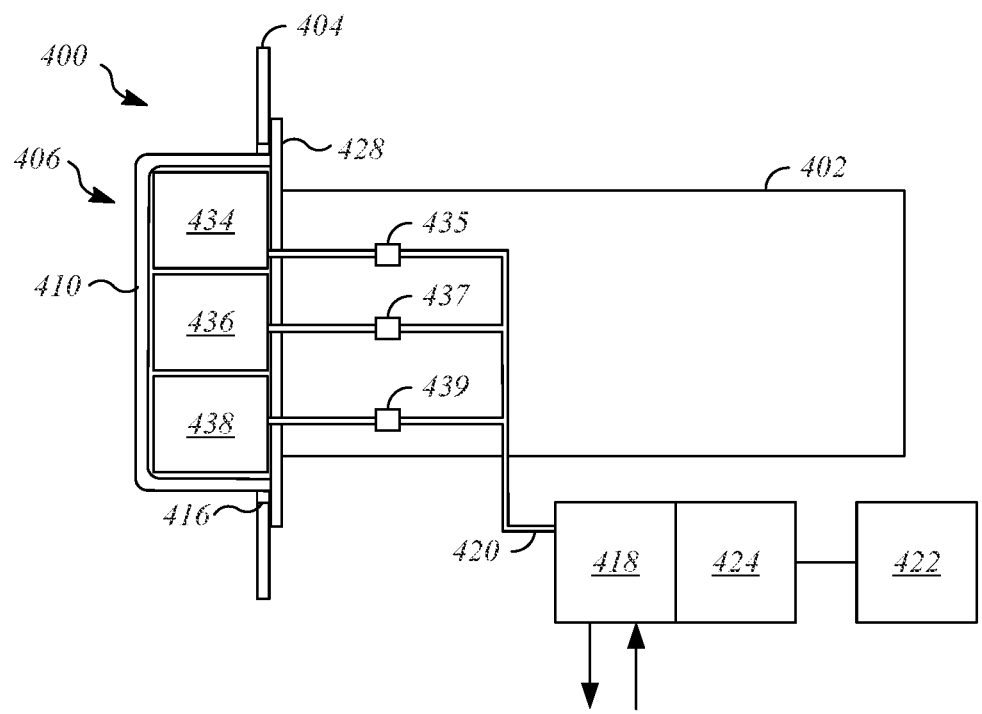
FIG. 7 is a side view illustration showing a portion of a vehicle including an extendable bumper system according to a fourth example in an extended position.

FIG. 7 shows a vehicle 400, that includes a vehicle structure 402, a body portion 404, and an extendable bumper system 406 disposed in an extended position. The vehicle 400 is similar to the vehicle 200 except as otherwise described herein.

The inflatable structure 410 is an elongate member that extends across the majority of the transverse dimension of the vehicle. The inflatable structure 410 defines a sealed interior that allows it to hold pressurized gas, similar to the structure described with respect to the inflatable structure 410. The inflatable structure 410 is formed from a material that is flexible and may be elastic or inelastic. Inflation of the inflatable structure 410 moves the position of the front of the inflatable structure 410 by a distance of approximately 20 mm-160 mm.

The inflatable structure 410 extends through an opening 416 that is defined by the body portion 404 of the vehicle 400. In this implementation the inflatable structure 410 may be deployed in response to sensing an impact, and thus may be concealed by structure such as a frangible panel (not shown) prior to moving to the extended position.

The inflatable structure 410 can be connected to the vehicle structure 402 and/or the body portion 404 by a mounting portion 428. In one implementation, the mounting portion 428 is formed from the same material as the inflatable structure 410, and may be formed separately or as an integral portion of the inflatable structure 410. In another implementation, the mounting portion 428 is a rigid member that defines part of the sealed interior of the inflatable structure 410 by being sealingly connected to the inflatable structure 410, such as by the mounting portion 428 being bonded to the inflatable structure 410 with and adhesive or by the mounting portion 428 being mechanically clamped to the inflatable structure 410. As an example, the rigid material can be a crushable material such as foam that maintains its shape during normal use but is able to crush in response to the types of forces experienced in a collision.

The inflatable structure 410 includes a plurality of internal chambers that are inflated when the extendable bumper system 406 is in the extended position. The plurality of internal chambers are arranged vertically one above the other, and are pressurized to different pressures in order to influence motion of external structures during a collision. In the illustrated example, a first internal chamber 434 is positioned at the top of the interior of the inflatable structure 410, a second internal chamber 436 is positioned below the first internal chamber 434, and a third internal chamber 438 is positioned below the second internal chamber 436. The first internal chamber 434 is a lowest inflated pressure, the second internal chamber 436 has a higher inflated pressure than the first internal chamber 434, and the third internal chamber has a higher inflated pressure than the second internal chamber 436. The interior space of the inflatable structure 410 that is outside of the internal chambers 434, 436, 438 may or may not be pressurized.

The inflatable structure 410 is connected to a valve assembly 418 by a pneumatic line 420. The valve assembly 418 is connected to a source of pressurized gas such as a compressor 424. The valve assembly 418 and the compressor 424 can be controlled by an electronic control unit 422, which can be similar to the electronic control unit 122. Alternatively, the inflatable structure could be inflated using another type of device such as a pyrotechnic inflator.

The pneumatic line 420 supplies pressurized gas to the first internal chamber 434 through a first valve 435, supplies pressurized gas to the second internal chamber 436 through a second valve 437, supplies pressurized gas to the third internal chamber 438 through a third valve 439. The first valve 435, the second valve 437, and the third valve 439 control the maximum inflation pressure for the first internal chamber 434, the second internal chamber 436, and the third internal chamber 438.

The inflatable structure 410 is inflated in order to move the extendable bumper system 406 to the extended position from the retracted position. To inflate the inflatable structure 410, compressed gas is supplied to the inflatable structure from the compressor 424 through the valve assembly 418 and the pneumatic line 420. Inflation of the inflatable structure 410 can be performed in response to control signals received at the valve assembly 418 and the compressor 424 from the electronic control unit 422, as explained with respect to the electronic control unit 122. In one implementation, the inflatable structure 410 is inflated in response to sensing an imminent collision.

Figure 8:
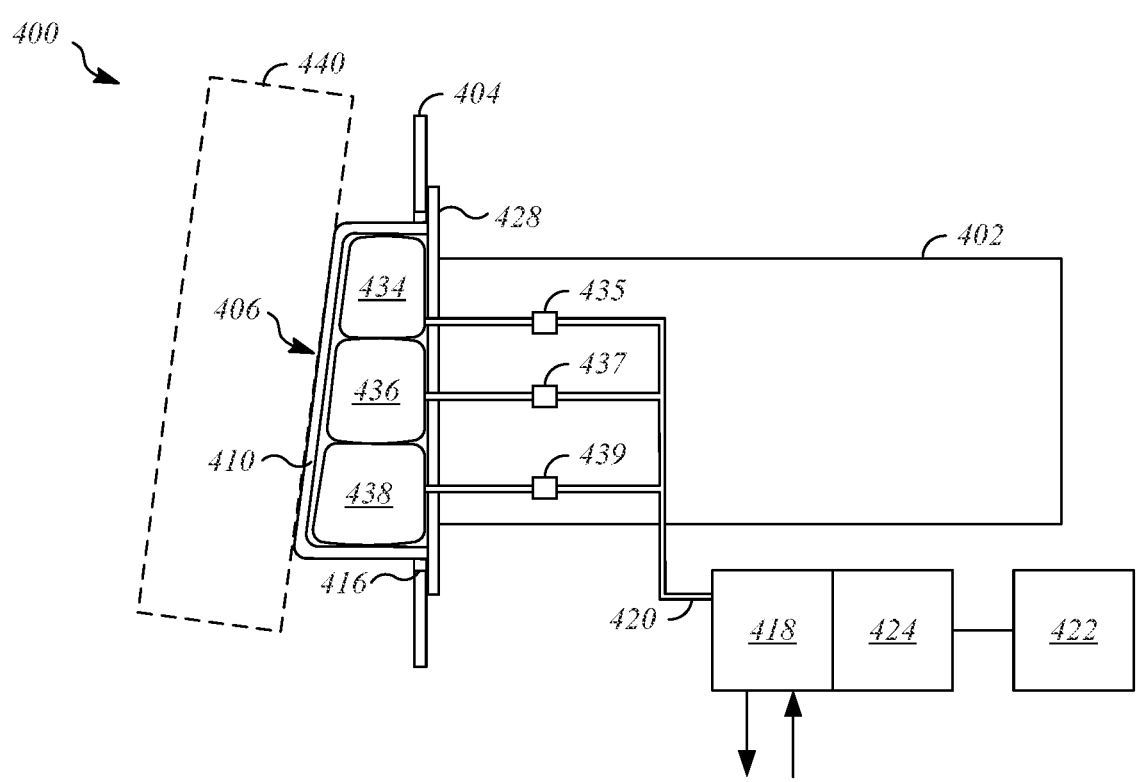
FIG. 8 is a side view illustration showing a portion of a vehicle including an extendable bumper system according to a fourth example during impact with an object.

FIG. 8 shows impact of an object 440 with the extendable bumper system 406. Because the of the different inflation pressures in the internal chambers 434, 436, 438, they deform differently in response to the impact. In particular, the first internal chamber 434 deforms to a greatest extent because it is inflated to the lowest pressure, the second internal chamber 436 deforms less than the first internal chamber 434, and the third internal chamber 438 deforms less than the second internal chamber. The differences in deformation induce a slight rotation of the top of the object 440 toward the vehicle 400.

Figure 9:
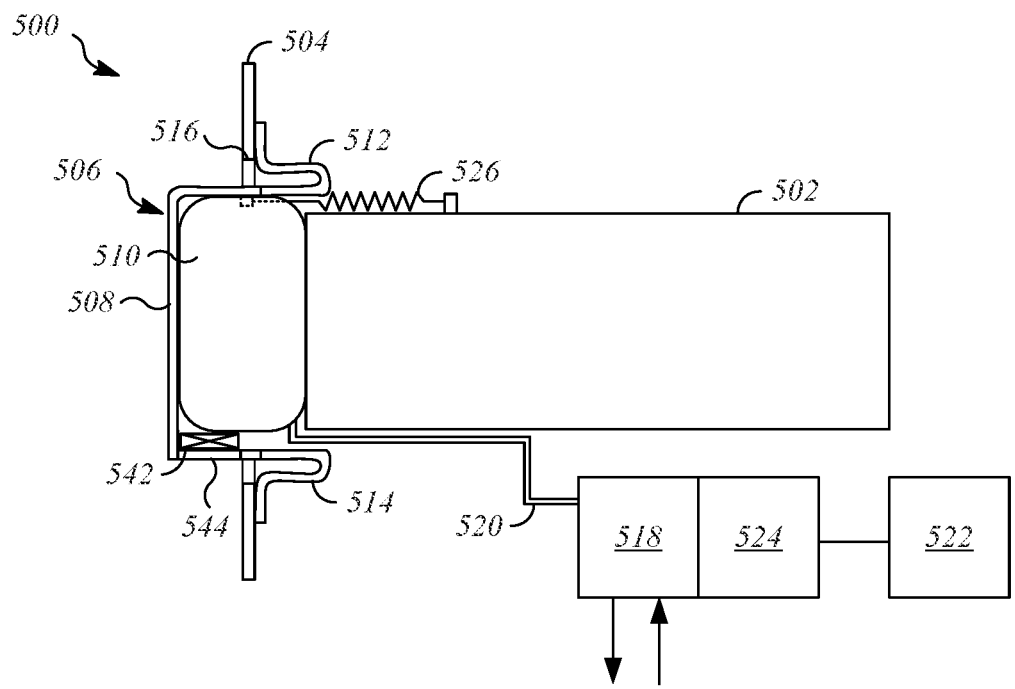
FIG. 9 is a side view illustration showing a portion of a vehicle including an extendable bumper system according to a fifth example in an extended position prior to inflation of a secondary inflatable portion.

FIG. 9 shows a portion of a vehicle 500 that is similar to the vehicle 100 except as described herein, and includes similar components such as a vehicle structure 502, a body portion 504, an extendable bumper system 506, a bumper cover 508 having a hollow interior 509, an inflatable structure 510, a first flexible hinge 512, a second flexible hinge 514, an opening 516, a valve assembly 518, a pneumatic line 520, an electronic control unit 522, a compressor 524 and one or more tension springs 526.

The extendable bumper system 506 includes a secondary inflatable portion 542 that is disposed in the hollow interior 509 of the bumper cover 508. The secondary inflatable portion 542 is disposed near a bottom surface of the bumper cover 508, adjacent to a frangible portion 544 that is configured to break or dislodge from the bumper cover 508 upon inflation of the secondary inflatable portion 542, which defines a downward-facing opening in the bumper cover 508.

The secondary inflatable portion 542 is uninflated when the extendable bumper system 506 is in the extended position and during normal operation of the vehicle. The secondary inflatable portion 542 can be inflated in response to signals from the electronic control unit 522, such as in anticipation of an imminent collision. To allow inflation, a pyrotechnic inflator or other inflation device can be incorporated in the secondary inflatable portion 542 or otherwise associated with the secondary inflatable portion 542.

Figure 10:
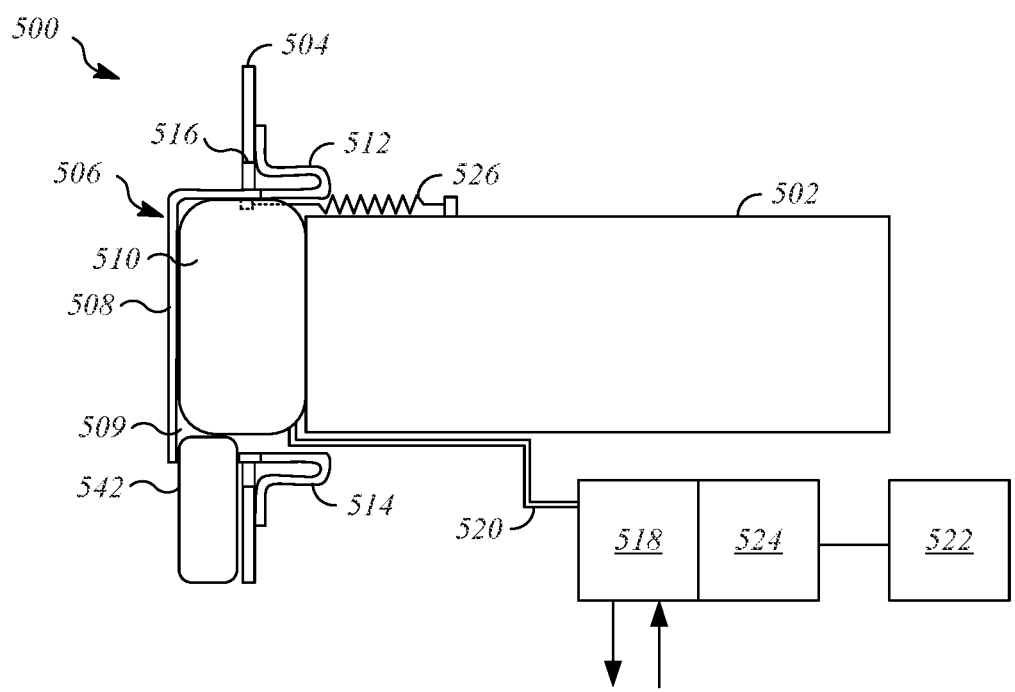
FIG. 10 is a side view illustration showing a portion of a vehicle including an extendable bumper system according to a fifth example subsequent to inflation of the secondary inflatable portion.

Upon inflation of the secondary inflatable portion 542, as shown in FIG. 10, the secondary inflatable portion extends downward out of the hole defined by breaking or dislodging of the frangible portion 544. When inflated, the secondary inflatable portion 542 is disposed adjacent to and covers at least part of the body portion 504.

In some implementations, the secondary inflatable portions 542 extend across a majority of the transverse dimension of the vehicle 500. In other implementations, multiple separate secondary inflatable portions 542 may be incorporated in the vehicle 500, spaced laterally across the bumper cover, and each can be separately activated by the electronic control unit 522 as needed, such as in response to sensing an imminent collision that is laterally aligned with a specific one of the secondary inflatable portions 542.

Figure 11:
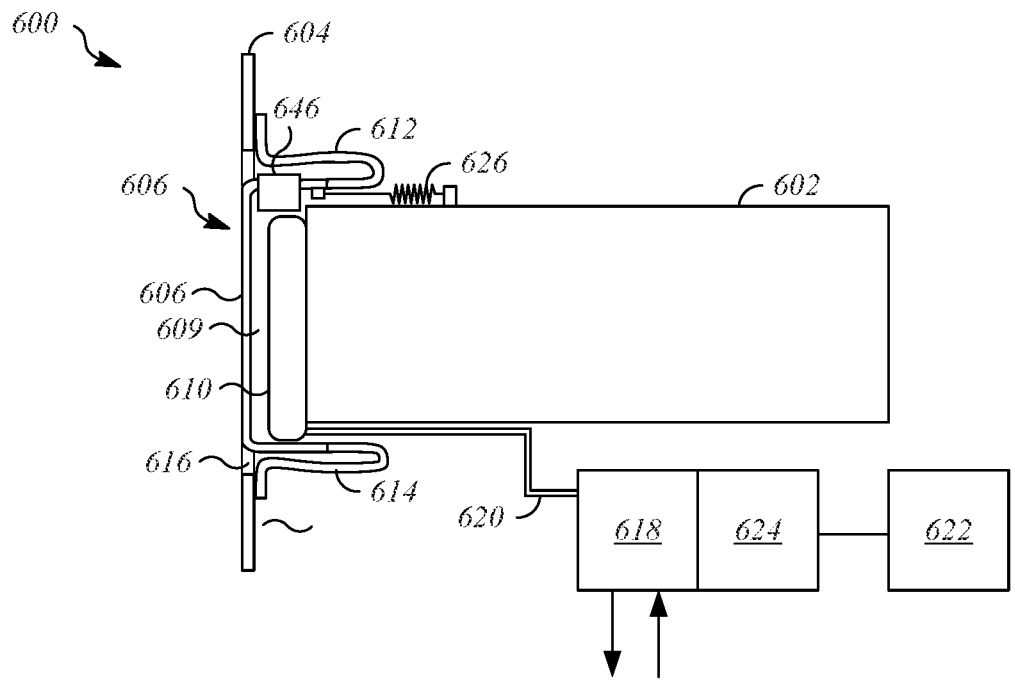
FIG. 11 is a side view illustration showing a portion of a vehicle including an extendable bumper system according to a sixth example in a retracted position.
Figure 12:
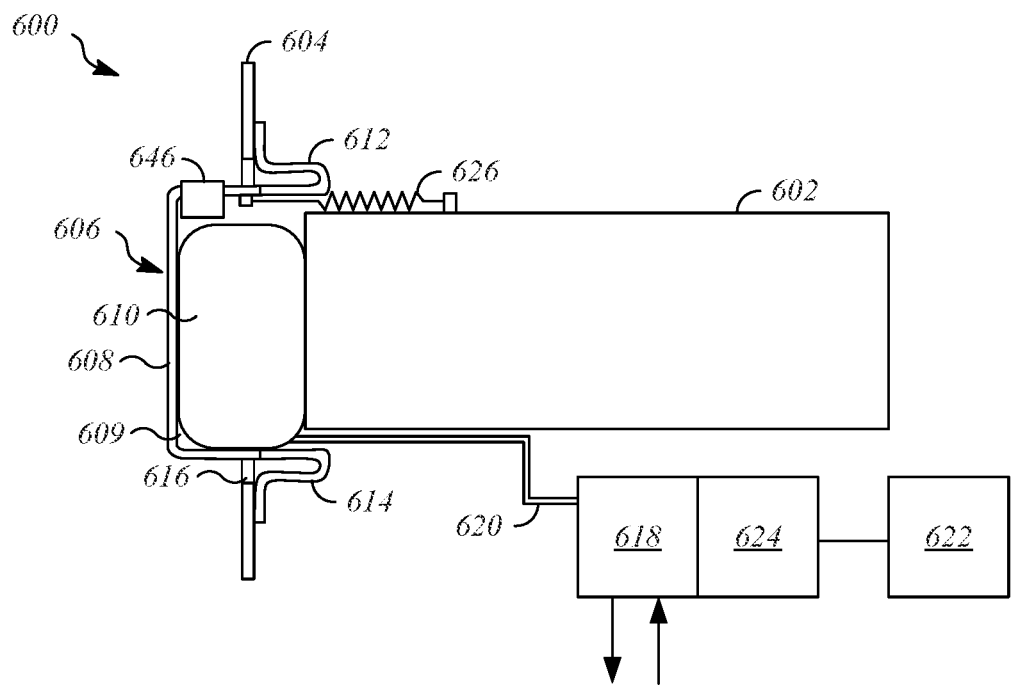
FIG. 12 is a side view illustration showing a portion of a vehicle including an extendable bumper system according to the sixth example in an extended position.

FIGS. 11-12 shows a portion of a vehicle 600 that is similar to the vehicle 100 except as described herein, and includes similar components such as a vehicle structure 602, a body portion 604, an extendable bumper assembly 606, a bumper cover 608 having a hollow interior 609, an inflatable structure 610, a first flexible hinge 612, a second flexible hinge 614, an opening 616, a valve assembly 618, a pneumatic line 620, an electronic control unit 622, a compressor 624 and one or more tension springs 626. The extendable bumper assembly 606 moves between a retracted position (FIG. 11) and an extended position (FIG. 12).

The vehicle 600 includes a component 646 that is disposed in an upper surface of the bumper cover 608. The component 646 can be an electrical component, a mechanical component, or an electromechanical component. As one example, the component 646 can be a light. As another example, the component 646 can be a washer nozzle. As another example, the component 646 can be a sensor.

The position of the component 646 is configured such that the component 646 is positioned rearward of the body portion 604 in the retracted position, and forward of the body portion 604 in the extended position. This allows the component 646 to be protected in the retracted position and exposed to the exterior of the vehicle 600 in the extended position so that it can be used.

Figure 13:
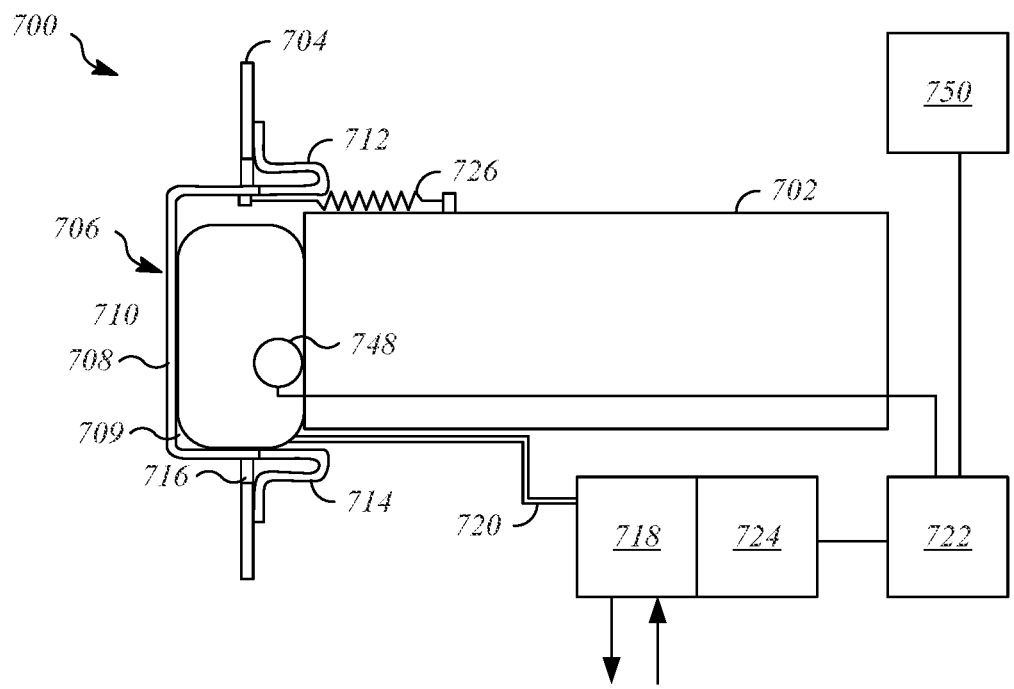
FIG. 13 is a side view illustration showing a portion of a vehicle including an extendable bumper system according to a seventh example in an extended position.

FIG. 13 shows a portion of a vehicle 700 that is similar to the vehicle 100 except as described herein, and includes similar components such as a vehicle structure 702, a body portion 704, an extendable bumper assembly 706, a bumper cover 708 having a hollow interior 709, an inflatable structure 710, a first flexible hinge 712, a second flexible hinge 714, an opening 716, a valve assembly 718, a pneumatic line 720, an electronic control unit 722, a compressor 724 and one or more tension springs 726. The extendable bumper assembly 706 moves between a retracted position (not shown) and an extended position (FIG. 13).

The vehicle 700 includes a sensor 748 that is disposed within the inflatable structure 710 and is able to output signals in response to changes in pressure within the inflatable structure. In one implementation, the sensor 748 includes a pressure transducer that is in fluid communication with the pressurized gas in the interior of the inflatable structure to directly measure the pressure of the pressurized gas. In another implementation the sensor 748 indirectly measures the pressure of the pressurized gas in the interior of the inflatable structure 710 be measuring the pressure of a separate enclosed volume of gas, such as an enclosed flexible tube.

The sensor 748 can be electrically connected to the electronic control unit 722. Signals output by the sensor 748 can be used by the electronic control unit to actuate a separate system, such as an airbag 750 that is located at the interior or exterior of the vehicle 700, to cause inflation of the airbag 750 in response to detecting an impact.

Although the implementations described above include a single extendable bumper, it will be appreciated that more than one extendable bumper could be provided at the front or rear of a vehicle. For example, two extendable bumpers could be provided in a vertically spaced configuration at the front of a vehicle, with the two extendable bumpers having different geometric configurations such as differing heights, depths, and extension distances.

Figure 14:
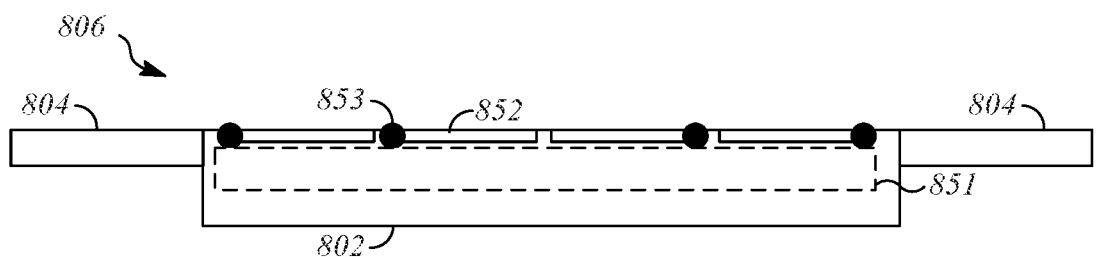
FIG. 14 is a top view illustration showing a portion of a vehicle including an extendable bumper system according to an eighth example in a retracted position.
Figure 15:
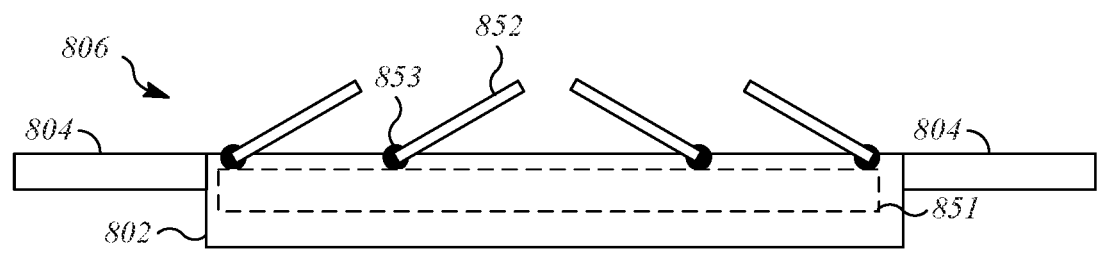
FIG. 15 is a top view illustration showing a portion of a vehicle including an extendable bumper system according to the eighth example in an extended position.

FIGS. 14-15 show an extendable bumper system 806 in a retracted position (FIG. 14) and an extended position (FIG. 15). The extendable bumper system 806 includes one or more flap portions 852 that are connected to a vehicle structure 802 by a respective pivot joint from one or more pivot joints 853, which can be fixed with respect to the vehicle structure 802 such that the flap portions 852 are moveable relative to a body portion 804 of the vehicle 800. To move from the retracted position to the extended position an actuator assembly 851 is connected to each of the flap portions 852 and or pivot joints 853 to drive rotation of the flap portions 852 by an angle of approximately 10-80 degrees. In the extended position, spaces between the flap portions allow airflow to structures behind the flap portions 852.

Figure 16:
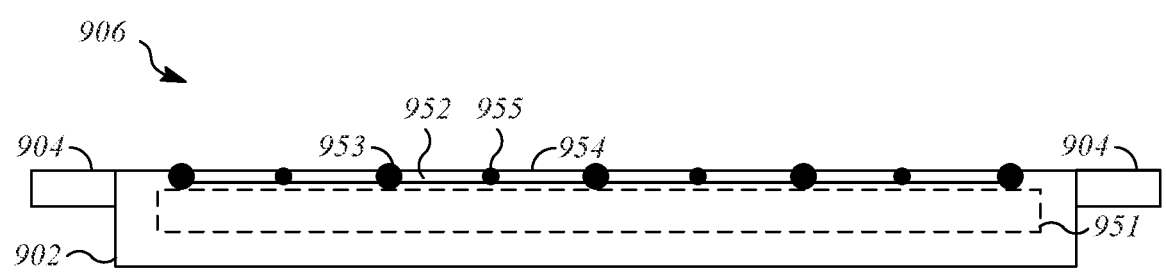
FIG. 16 is a top view illustration showing a portion of a vehicle including an extendable bumper system according to a ninth example in a retracted position.
Figure 17:
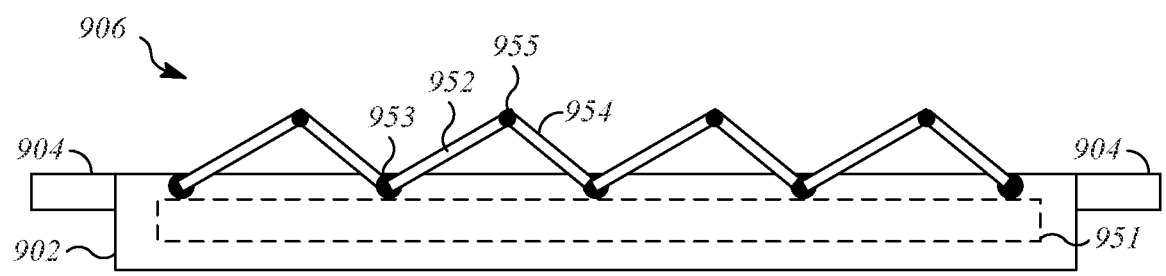
FIG. 17 is a top view illustration showing a portion of a vehicle including an extendable bumper system according to the ninth example in an extended position.

FIGS. 16-17 show an extendable bumper system 906 in a retracted position (FIG. 16) and an extended position (FIG. 17). The extendable bumper system 906 includes one or more first flap portions 952 that are connected to a vehicle structure 902 by a respective pivot joint from one or more first pivot joints 953, which can be fixed with respect to the vehicle structure 902. The extendable bumper system 906 also includes one or more second flap portions 954 that are each connected to a respective one of the first pivot joints 953 as well as to a pivot joint from one or more second pivot joints 955 that are connected to a respective one of the first flap portions 952 by a sliding connection. This allows the second flap portions 954 and the first flap portions 952 to define pairs of nested flap portions in which the second flap portions 954 to nest with respect to the first flap portions 952 in an overlapping fashion when in the retracted position. To move from the retracted position to the extended position an actuator assembly 951 is connected to each of the first flap portions 952 and or first pivot joints 953 to drive rotation of the first flap portions 952 by an angle of approximately 10-80 degrees, which causes corresponding rotation of the second flap portions 954 as the second pivot joints 955 slide with respect to the first flap portions 952, such that the first flap portions 952 and the second flap portions 954 are move relative to a body portion 904 of the vehicle 900.

Figure 18:
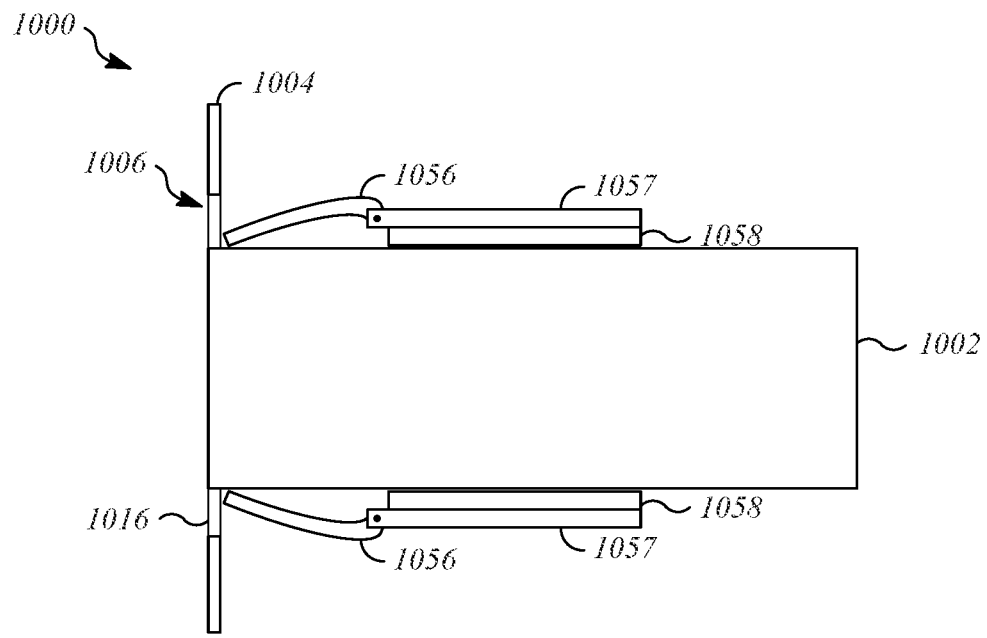
FIG. 18 is a side view illustration showing a portion of a vehicle including an extendable bumper system according to a tenth example in a retracted position.
Figure 19:
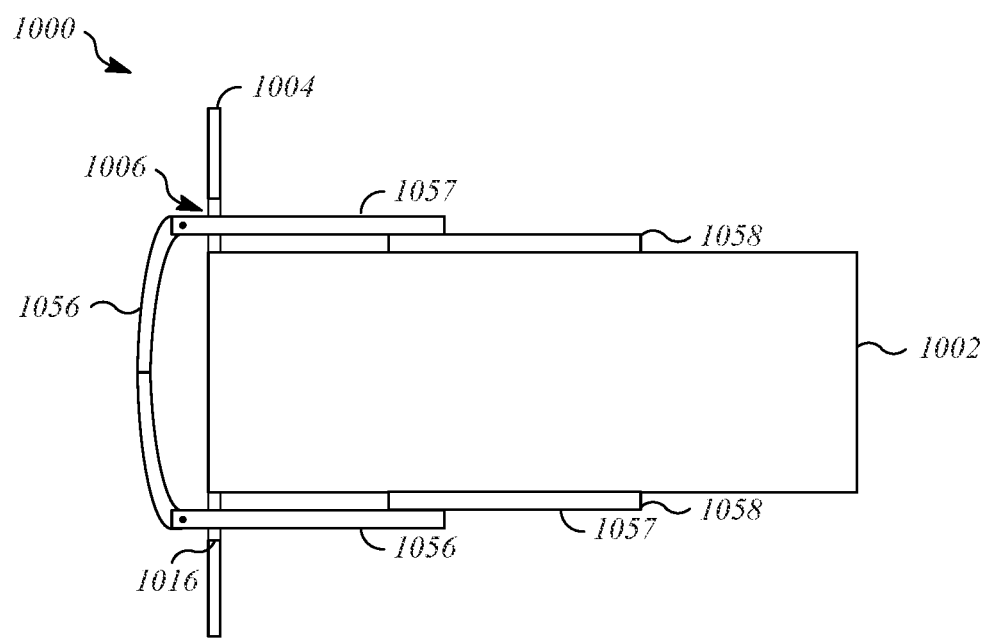
FIG. 19 is a side view illustration showing a portion of a vehicle including an extendable bumper system according to the tenth example in an extended position.

FIGS. 18-19 show a portion of a vehicle 1000 having a vehicle structure 1002, a body portion 1004, and an extendable bumper system 1006. The extendable bumper system 1006 includes a pair of panels 1056 that are pivotally connected to supports 1057 that are connected to the vehicle structure 1002 by a linear actuator 1058 that moves the extendable bumper system 1006 between a retracted position (FIG. 18) and an extended position (FIG. 19). The pivotal connection of the panels 1056 to the supports 1057 can be spring-loaded to allow the panels 1056 to pivot toward each other in the extended position. Thus, the panels 1056 are disposed within the vehicle 1000, such as above and below the vehicle structure 1002 in the retracted position, and outward movement of the panels 1056 and the supports 1057 by the linear actuator moves the panels out of an opening 1016 defined by the body portion 1004 until the panels 1056 clear the vehicle structure 1002 and are able to pivot towards each other under influence of their spring-loaded connections to the respective supports 1057.

Figure 20:
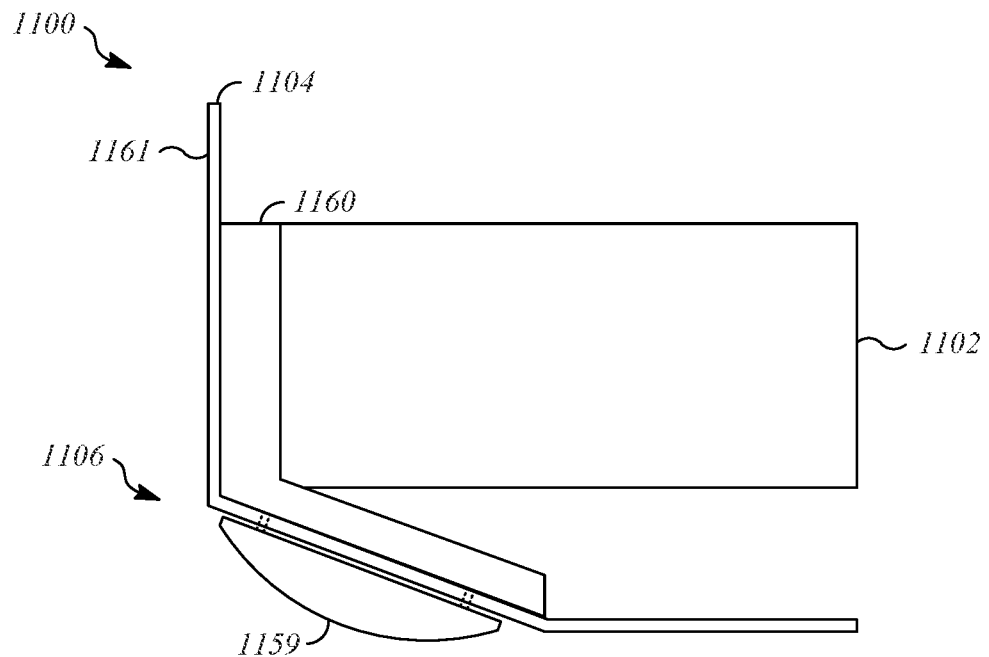
FIG. 20 is a side view illustration showing a portion of a vehicle including an extendable bumper system according to an eleventh example in a retracted position.
Figure 21:
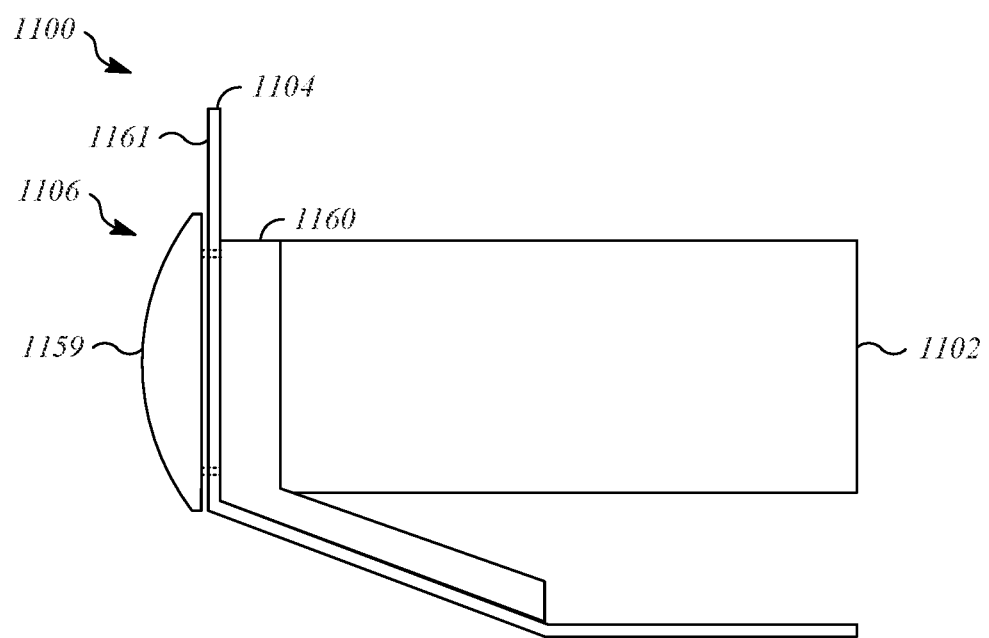
FIG. 21 is a side view illustration showing a portion of a vehicle including an extendable bumper system according to the eleventh example in an extended position.

FIGS. 20-21 show a portion of a vehicle 1100 having a vehicle structure 1102, a body portion 1104, and an extendable bumper system 1106. The extendable bumper system 1106 includes a moveable panel 1159 and an actuator assembly 1160 that is connected to the moveable panel is operable to move the moveable panel 1159 between a retracted position (FIG. 20) and an extended position (FIG. 21). The moveable panel 1159 can be made of a material that provides a soft initial contact in an impact, such as a crushable foam or an inflated member.

The body portion 1104 includes a surface 1161 that is a front most or rear most surface of the vehicle 1100. The moveable panel 1159 can be disposed away from the surface 1161 in the retracted position in a position that is external to the vehicle 1100 such as adjacent to a lower surface or an upper surface of the vehicle 1100. To move the extendable bumper system 1106 to the extended position, the actuator assembly 1160 moves the moveable panel 1159 to until it is located adjacent to the surface 1161. The actuator assembly 1160 can include, as examples, a track or linkage that supports the moveable panel 1159 and an actuator such as an electric motor that drives the moveable panel between the extended and retracted positions in response to signals from an electronic control unit.

Figure 22:
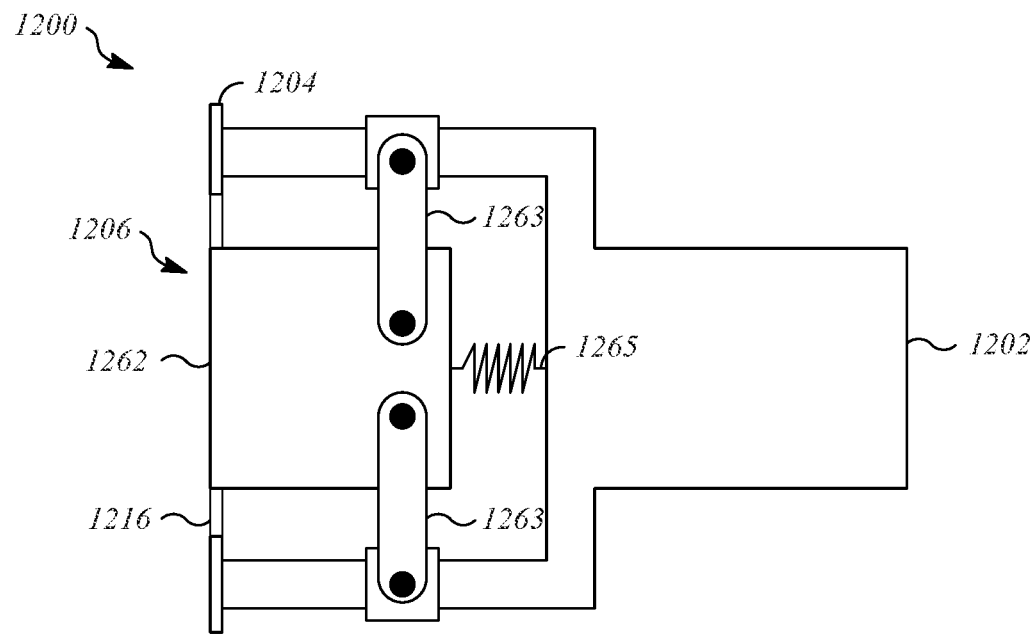
FIG. 22 is a side view illustration showing a portion of a vehicle including an extendable bumper system according to a twelfth example in a retracted position.
Figure 23:
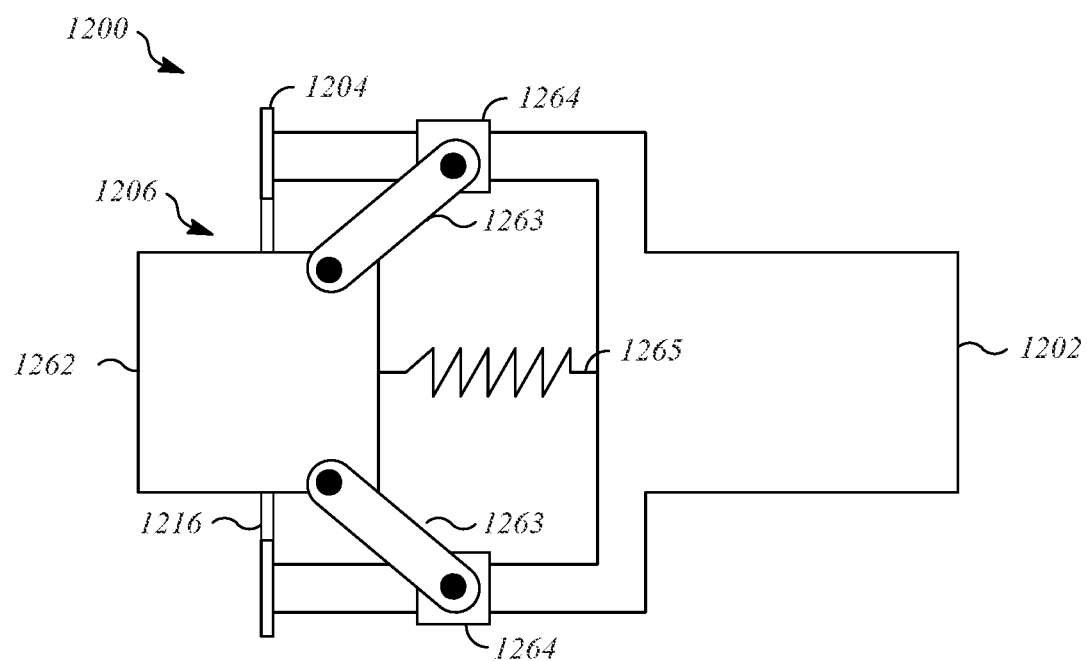
FIG. 23 is a side view illustration showing a portion of a vehicle including an extendable bumper system according to the twelfth example in an extended position.

FIGS. 22-23 show a portion of a vehicle 1200 having a vehicle structure 1202, a body portion 1204, and an extendable bumper system 1206. The extendable bumper system 1206 includes a moveable bumper 1262 and that is connected to the vehicle structure 1202 by one or more levers 1263, such as two levers in the illustrated implementation. The levers 1263 can be pivotally connected to the moveable bumper 1262 and the vehicle structure 1202, with one of the pivotal connections also allowing sliding motion. An actuator 1264 such as an electric motor controlled by an electronic control unit can be associated with some or all of levers 1263 to cause motion of the moveable bumper between a retracted position (FIG. 22) and an extended position (FIG. 23) out of and in to an opening 1216 defined by the body portion 1204. In the illustrated implementation, the actuators 1264 pivot the levers 1263 to move the moveable bumper from the retracted position to the extended position, and the moveable bumper 1262 can be returned to the retracted position by a resilient biasing element such as a tension spring 1265.

Figure 24:
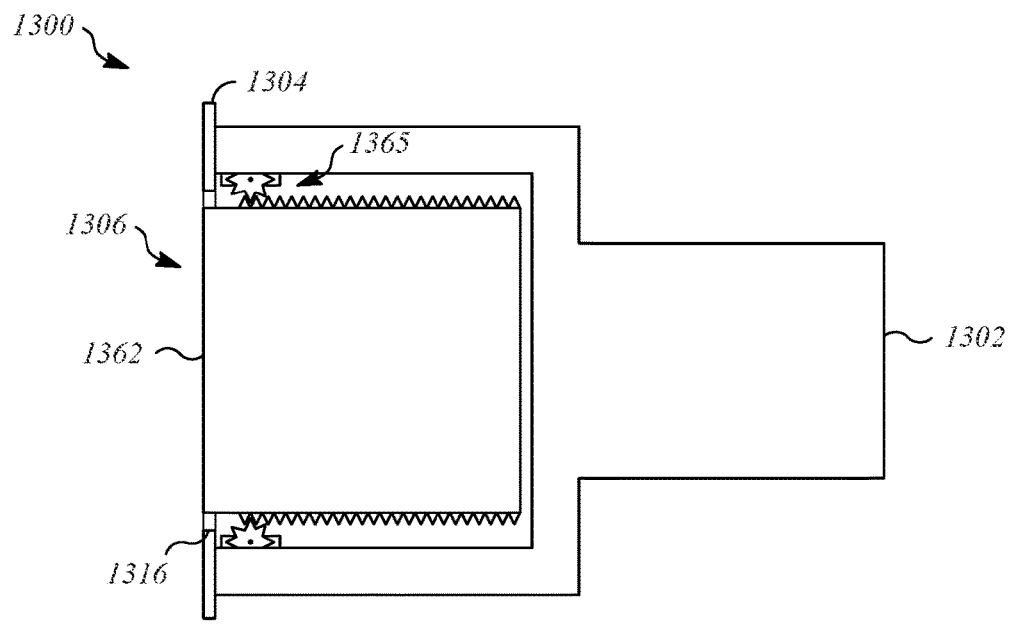
FIG. 24 is a side view illustration showing a portion of a vehicle including an extendable bumper system according to a thirteenth example in a retracted position.
Figure 25:
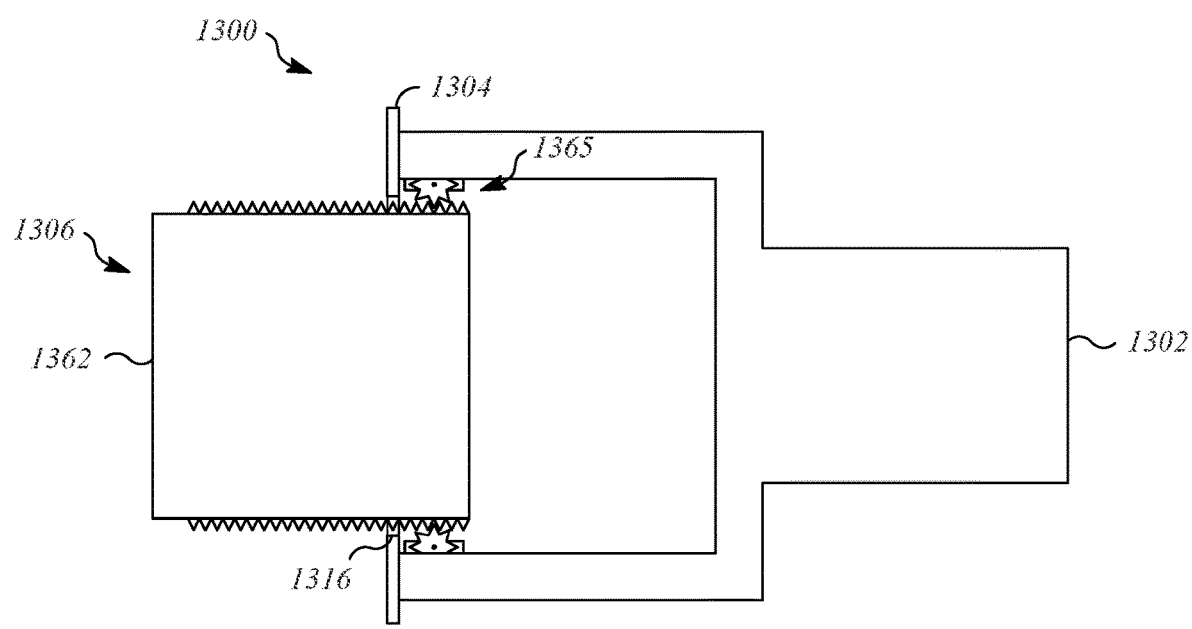
FIG. 25 is a side view illustration showing a portion of a vehicle including an extendable bumper system according to the thirteenth example in an extended position.

FIGS. 24-25 show a portion of a vehicle 1300 having a vehicle structure 1302, a body portion 1304, and an extendable bumper system 1306. The extendable bumper system 1306 includes a moveable bumper 1362 and that is connected to the vehicle structure 1302 by a rack and pinion assembly 1365 that includes an actuator such as an electric motor controlled by an electronic control unit to cause motion of the moveable bumper between a retracted position (FIG. 24) and an extended position (FIG. 25) out of and in to an opening 1316 defined by the body portion 1304.

Figure 26:
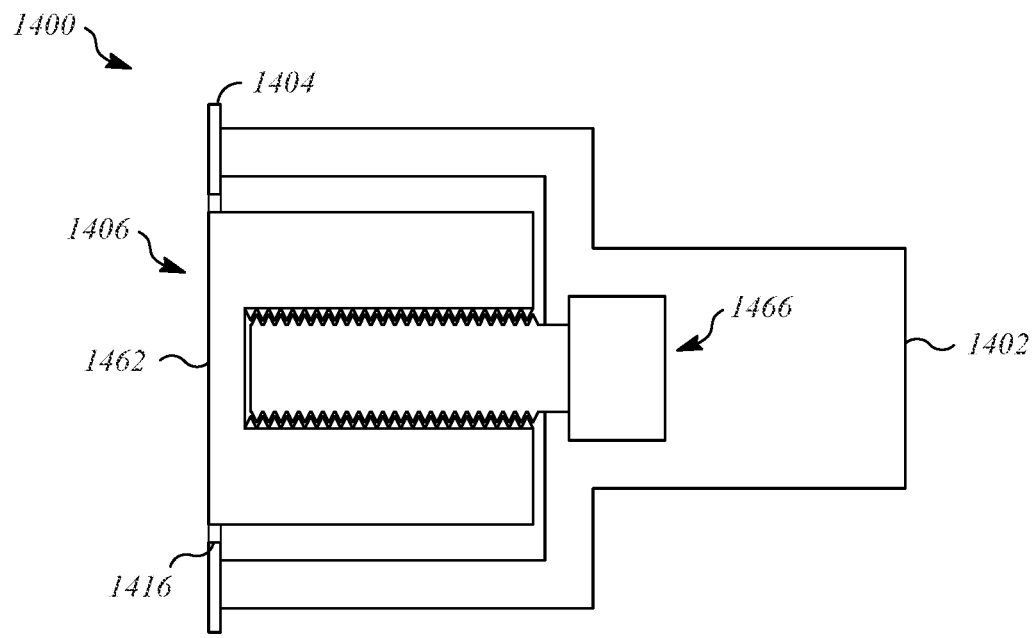
FIG. 26 is a side view illustration showing a portion of a vehicle including an extendable bumper system according to a fourteenth example in a retracted position.
Figure 27:
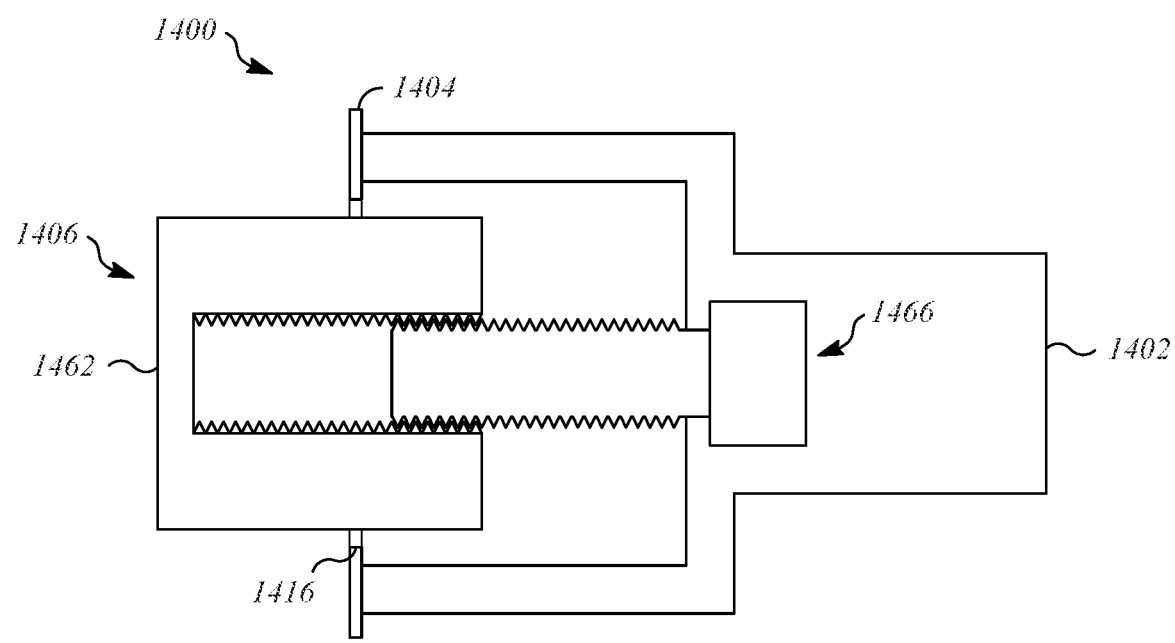
FIG. 27 is a side view illustration showing a portion of a vehicle including an extendable bumper system according to the fourteenth example in an extended position.

FIGS. 26-27 show a portion of a vehicle 1400 having a vehicle structure 1402, a body portion 1404, and an extendable bumper system 1406. The extendable bumper system 1406 includes a moveable bumper 1462 and that is connected to the vehicle structure 1402 by a screw drive assembly 1466 having an actuator such as an electric motor controlled by an electronic control unit to cause motion of the extendable bumper system 1406 between a retracted position (FIG. 26) and an extended position (FIG. 27) out of and in to an opening 1416 defined by the body portion 1404.

Figure 28:
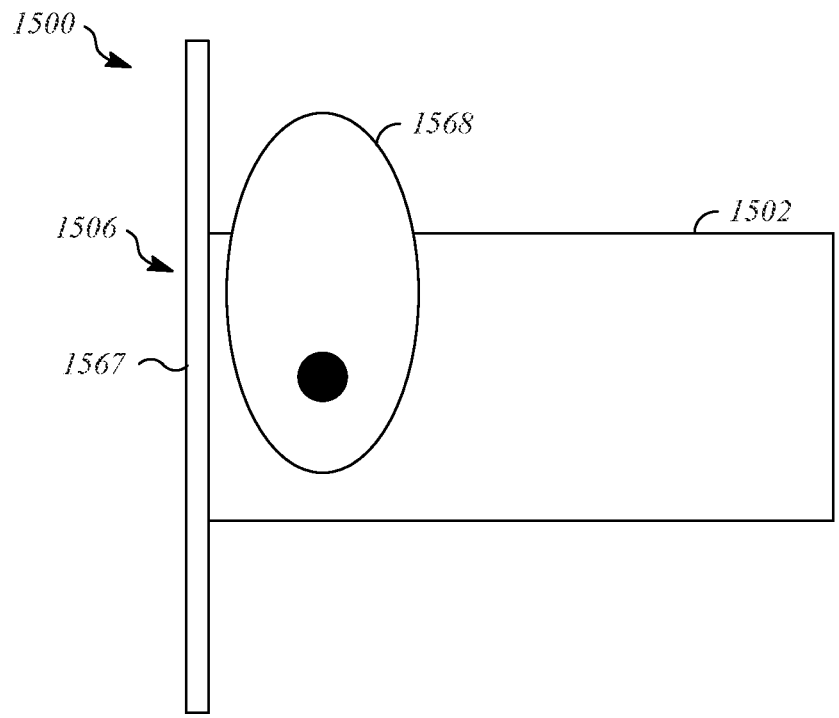
FIG. 28 is a side view illustration showing a portion of a vehicle including an extendable bumper system according to a fifteenth example in a retracted position.
Figure 29:
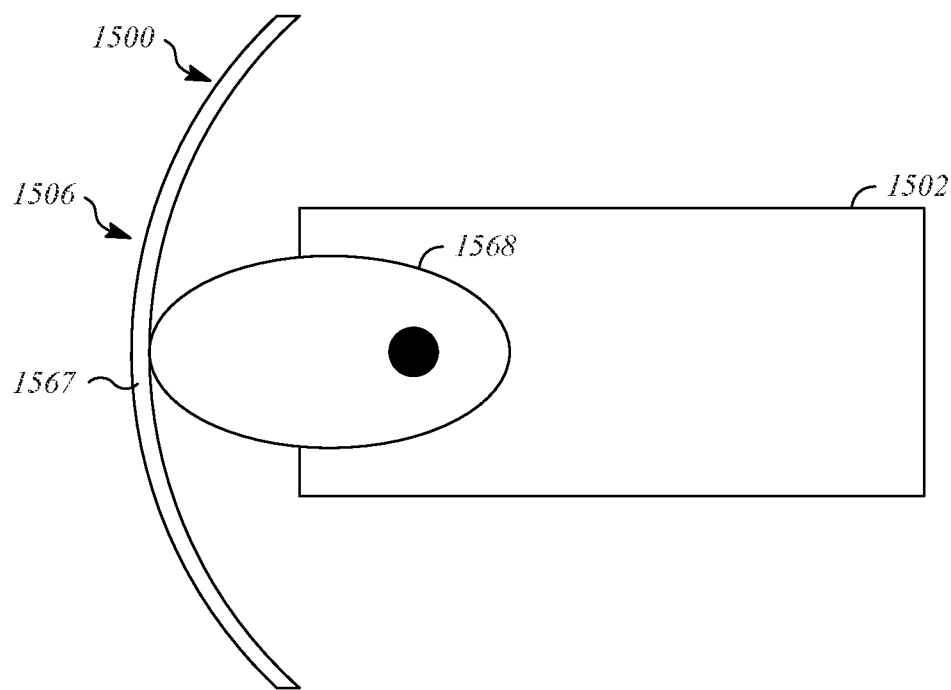
FIG. 29 is a side view illustration showing a portion of a vehicle including an extendable bumper system according to the fifteenth example in an extended position.

FIGS. 28-29 show a portion of a vehicle 1500 having a vehicle structure 1502 and an extendable bumper system 1506. The extendable bumper system 1506 includes a flexible fascia 1567 and a cam assembly 1568. The cam assembly 1568 rotates under the influence of an included actuator such as an electric motor controlled by an electronic control unit. When rotated, the cam assembly 1568 engages the interior of the flexible fascia 1567, which flexes the flexible fascia 1567 outward from its nominal position to cause motion of the extendable bumper system 1506 between a retracted position (FIG. 28) and an extended position (FIG. 29).

Figure 30:
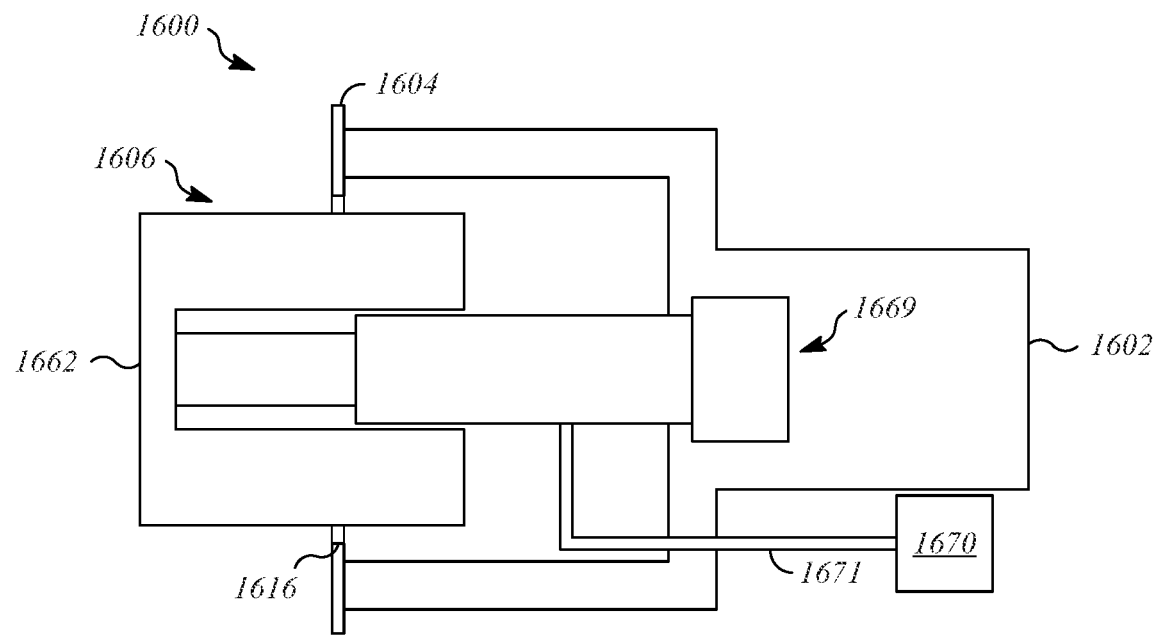
FIG. 30 is a side view illustration showing a portion of a vehicle including a bumper system according to a sixteenth example that includes a variable speed hydraulic damper.

FIG. 30 shows a portion of a vehicle 1600 having a vehicle structure 1602, a body portion 1604, and a bumper system 1606. The bumper system 1606 includes a bumper 1662 that extends out of an opening 1616 in the body portion 1604 and is connected to the vehicle structure 1602 by a variable speed damper 1669. The variable speed damper 1669 is operable to allow motion of the bumper 1662 in the longitudinal direction of the vehicle in response to an impact to provide a soft initial contact. The variable speed damper 1669 is also operable to lock out longitudinal motion of the bumper 1662. For example, the lock out function of the variable speed damper 1669 could be actuated by pressurized fluid supplied by a pressurized fluid source 1670 through a fluid line 1671. The lock out function of the variable speed damper 1669 can be activated, for example, in response to a signal from an electronic control unit indicating that a speed of the vehicle 1600 is in excess of a threshold speed.

Figure 31:
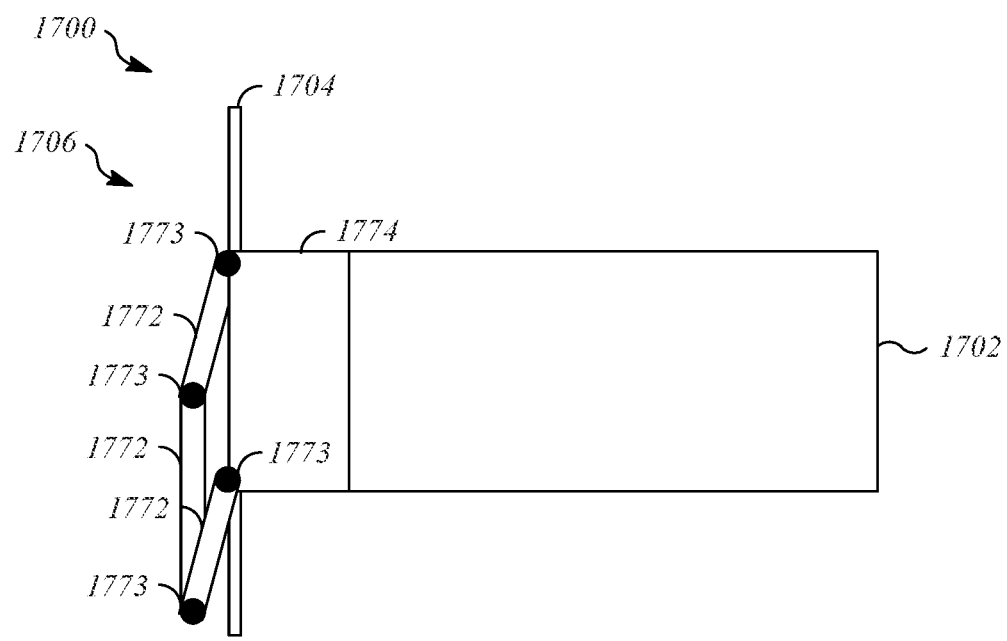
FIG. 31 is a side view illustration showing a portion of a vehicle including an extendable bumper system according to a seventeenth example in a retracted position.
Figure 32:
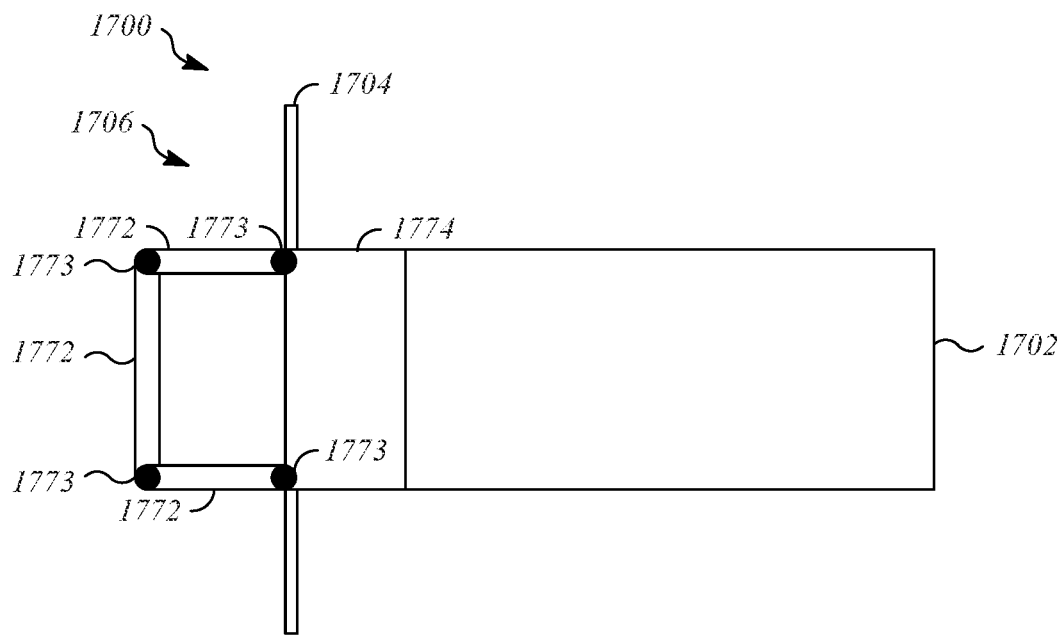
FIG. 32 is a side view illustration showing a portion of a vehicle including an extendable bumper system according to the seventeenth example in an extended position.

FIGS. 31-32 show a portion of a vehicle 1700 having a vehicle structure 1702, a body portion 1704, and an extendable bumper system 1706. The extendable bumper system 1706 includes a collapsible parallelogram structure defined by a plurality of panels 1772 that are interconnected by pivot joints 1773. The collapsible parallelogram structure is connected to the vehicle structure 1702 by an actuator assembly 1774 that is operable to apply a rotational force to at least some of the pivot joints 1773 in order to cause motion of the extendable bumper system 1706 between a retracted position (FIG. 31) and an extended position (FIG. 32).

Figure 33:
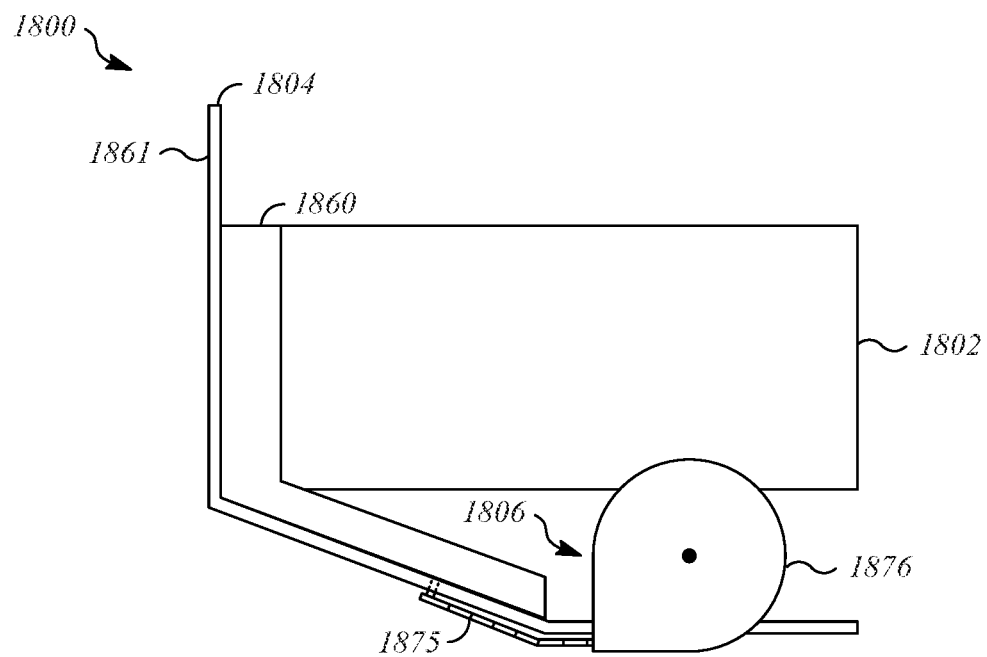
FIG. 33 is a side view illustration showing a portion of a vehicle including an extendable bumper system according to an eighteenth example in a retracted position.
Figure 34:
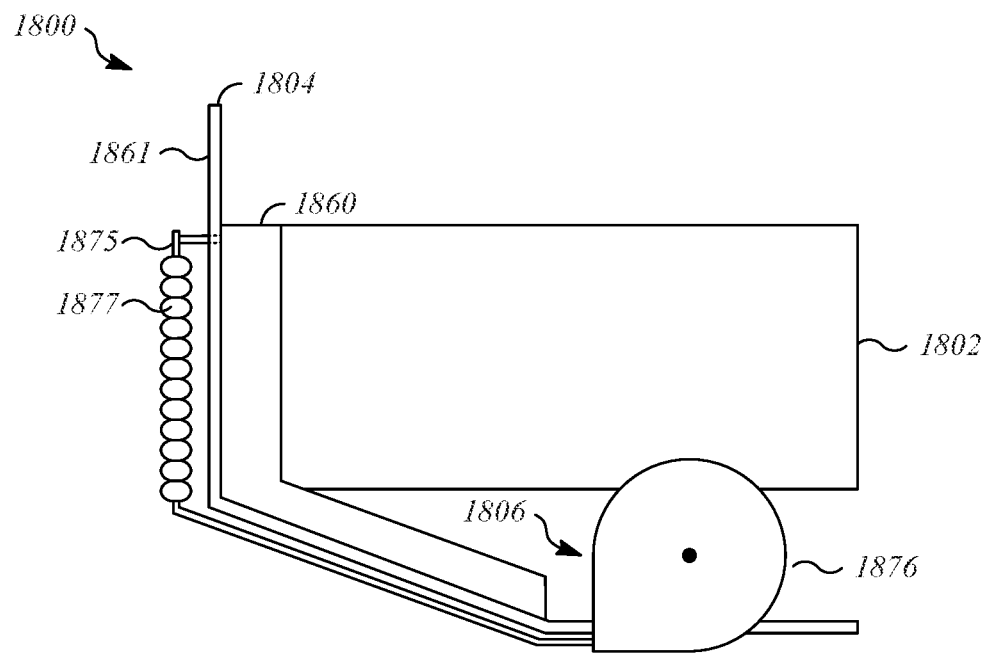
FIG. 34 is a side view illustration showing a portion of a vehicle including an extendable bumper system according to the eighteenth example in an extended position.

FIGS. 33-34 show a portion of a vehicle 1800 having a vehicle structure 1802, a body portion 1804, and an extendable bumper system 1806. The extendable bumper system 1806 includes a flexible panel 1875 that is stored on a roll 1876 and an actuator assembly 1860 that is connected to the flexible panel 1875 is operable to move the flexible panel 1875 between a retracted position (FIG. 33) and an extended position (FIG. 34). The flexible panel 1875 may be adjacent to a lower surface of the body portion 1804 in the retracted position and the flexible panel 1875 may be adjacent to a front surface of the body portion 1804 in the extended position.

The body portion 1804 includes a surface 1861 that is a front most or rear most surface of the vehicle 1800. The flexible panel 1875 can be disposed on the roll 1876 in a rolled-up configuration away from the surface 1861 in the retracted position. The roll 1876 can be positioned internal or external to the vehicle 1800 such as adjacent to a lower surface of the vehicle 1800.

To move the extendable bumper system 1806 to the extended position, the actuator assembly 1860 is connected to the flexible panel 1875 such that the flexible panel 1875 deploys from the roll 1876 to an unrolled configuration as the actuator assembly 1860 moves at least part of the flexible panel 1875 to until it is located adjacent to the surface 1861. The actuator assembly 1860 can include, as examples, a track or linkage that is driven by an electric motor in response to signals from an electronic control unit.

Once the flexible panel 1875 is disposed in the extended position, a pressurized gas can be supplied to inflatable cells 1877 that are formed in the flexible panel 1875 to inflate the inflatable cells. The inflatable cells 1877 are configured to provide a soft initial contact in an impact. The flexible panel 1875 is returned to the retracted position by deflating the cells and moving the flexible panel 1875 using the actuator assembly 1860 to place it back in the roll 1876. To facilitate this process, the roll 1876 can apply tension to the flexible panel 1875, such as by being spring-loaded.

Figure 35:
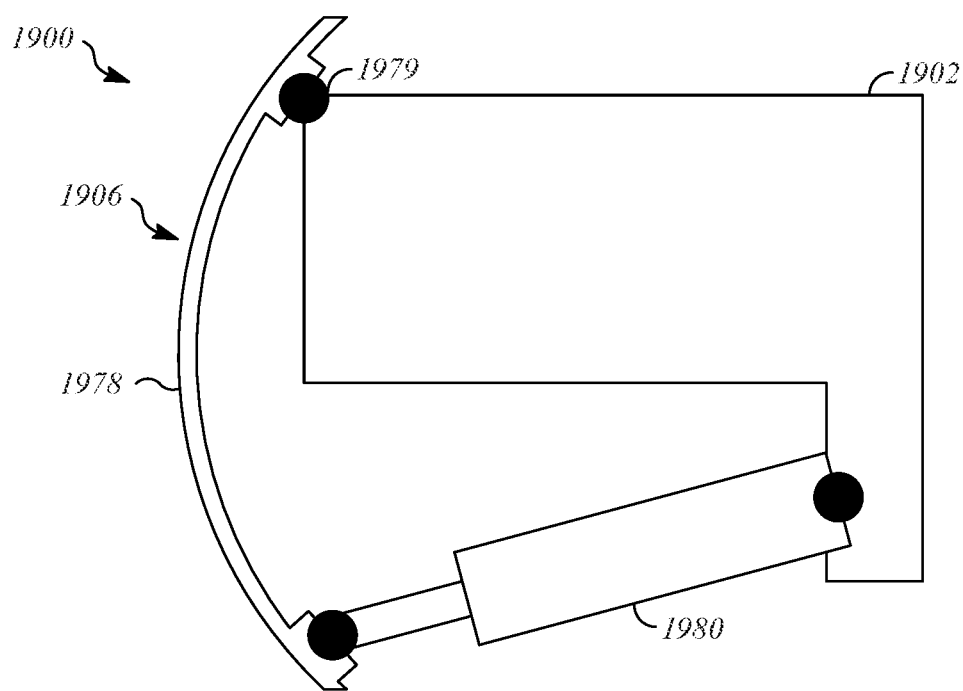
FIG. 35 is a side view illustration showing a portion of a vehicle including an extendable bumper system according to a nineteenth example in a retracted position.
Figure 36:
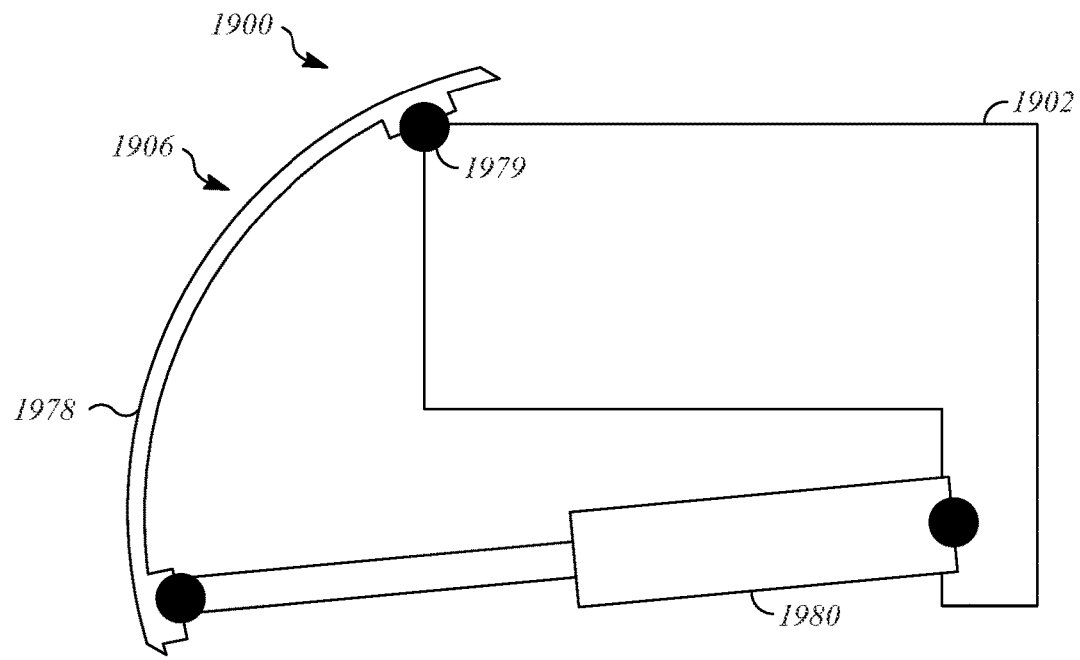
FIG. 36 is a side view illustration showing a portion of a vehicle including an extendable bumper system according to the nineteenth example in an extended position.

FIGS. 35-36 show a portion of a vehicle 1900 having a vehicle structure 1902 and an extendable bumper system 1906. The extendable bumper system 1906 includes a fascia 1978 that is pivotally connected to part of the vehicle 100 such as the vehicle structure 1902 or a body portion at a pivot joint 1979. The fascia 1978 can be rigid or flexible. The extendable bumper system 1906 also includes a linear actuator 1980 that extends and retracts in response to, for example, control signals from an electronic control unit. The linear actuator 1980 is connected to the fascia 1978 such that extension and retraction causes pivoting of the fascia 1978 around the pivot joint 1979. Thus, extension and retraction of the linear actuator 1980 moves the fascia 1978 between a retracted position (FIG. 35) and an extended position (FIG. 36).

Figure 37:
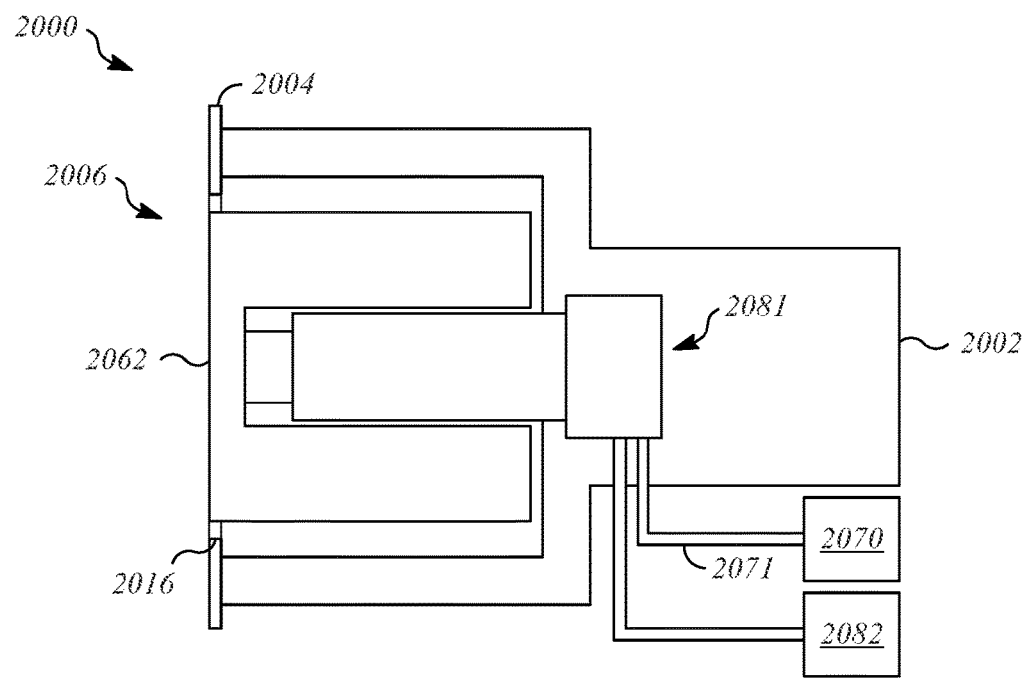
FIG. 37 is a side view illustration showing a portion of a vehicle including an extendable bumper system according to a twentieth example in a retracted position.
Figure 38:
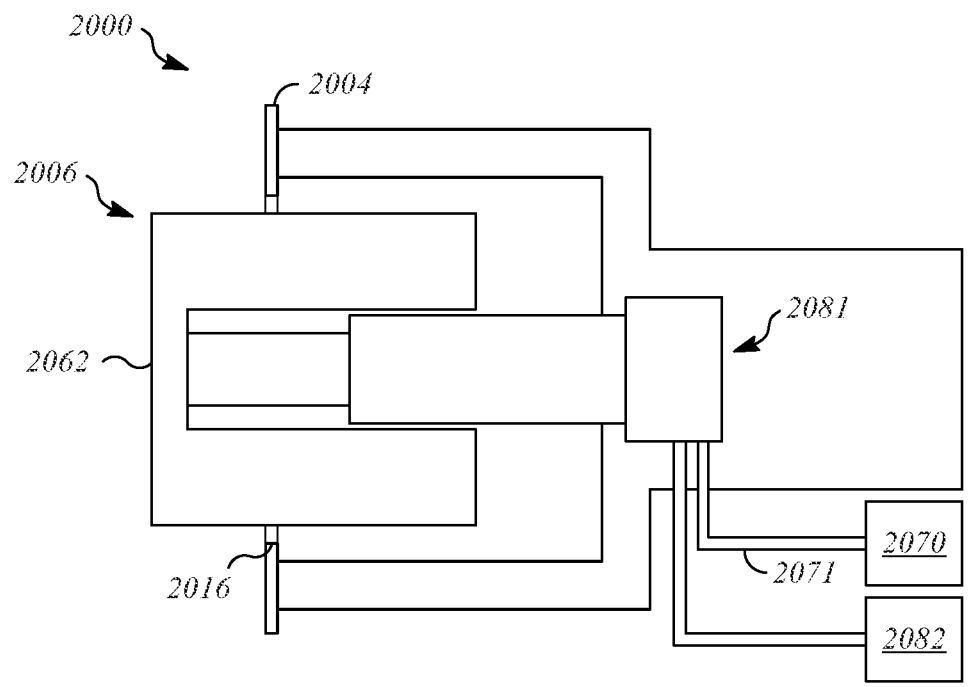
FIG. 38 is a side view illustration showing a portion of a vehicle including an extendable bumper system according to the twentieth example in an extended position.

FIGS. 37-38 show a portion of a vehicle 2000 having a vehicle structure 2002, a body portion 2004, and a bumper system 2006. The bumper system 2006 includes a bumper 2062 that extends out of an opening 2016 in the body portion 2004 and is connected to the vehicle structure 2002 by a fluid operated cylinder actuator 2081. The fluid operated cylinder actuator 2081 is operable to cause movement of the bumper 2062 between a retracted position (FIG. 37) and an extended position (FIG. 38) in response to supply of pressurized fluid supplied by a pressurized fluid source 2070 through a fluid line 2071, such as in response to control signals from an electronic control unit.

To provide a soft initial contact during an impact, the fluid operated cylinder actuator 2081 is connected to a bleeder valve 2082 that reduces fluid pressure inside the fluid operated cylinder actuator 2081. This pressure reduction can be controlled passively by the bleeder valve 2082 opening in response to pressure above a threshold value, or could be controlled actively such as by an electronic control unit in response to detecting an impact. Thus, the bleeder valve 2082 allows control of the motion of the fluid operated cylinder actuator 2081 between the extended and retracted positions during contact of the bumper 2062 with an external object.

Figure 39:
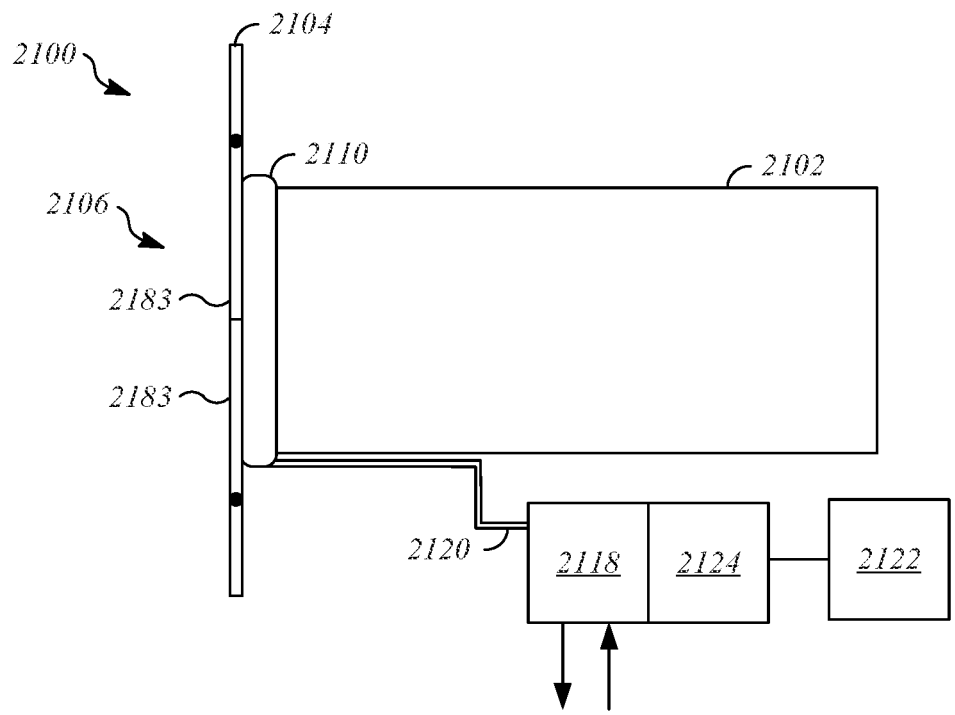
FIG. 39 is a side view illustration showing a portion of a vehicle including an extendable bumper system according to a twenty-first example in a retracted position.
Figure 40:
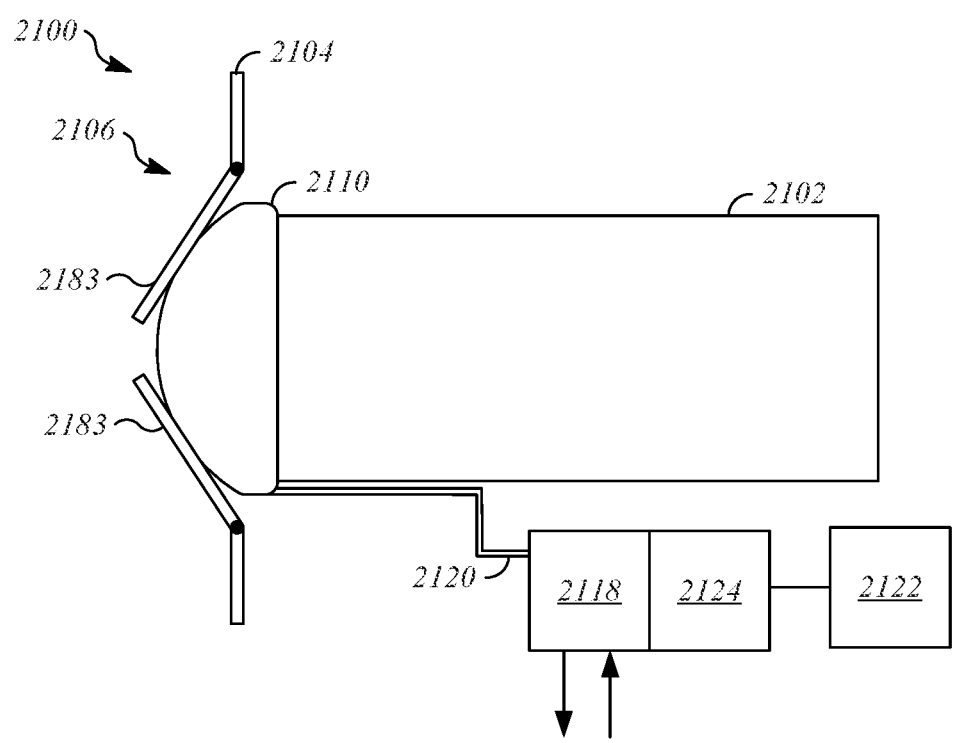
FIG. 40 is a side view illustration showing a portion of a vehicle including an extendable bumper system according to the twenty-first example in an extended position.

FIGS. 39-40 show a vehicle 2100, that includes a vehicle structure 2102, a body portion 2104, and an extendable bumper system 2106. The vehicle 2100 is similar to the vehicle 100 except as otherwise described herein.

The extendable bumper system 2106 includes an inflatable structure 2110 that moves between a retracted position (FIG. 39) and a retracted position (FIG. 40) by inflating and deflating. The inflatable structure 2110 defines a sealed interior that allows it to hold pressurized gas, similar to the structure described with respect to the inflatable structure 2110. The inflatable structure 2110 is formed from a material that is flexible and can be elastic or inelastic. The inflatable structure 2110 can be connected to the vehicle structure 2102 and/or the body portion 2104 by fasteners, adhesives, or other suitable structures.

The inflatable structure 2110 is connected to a valve assembly 2118 by a pneumatic line 2120. The valve assembly 2118 is connected to a source of pressurized gas such as a compressor 2124. The valve assembly 2118 and the compressor 2124 can be controlled by an electronic control unit 2122, which can be similar to the electronic control unit 122.

The extendable bumper system 2106 includes one or more fascia panels 2183 that move in response to inflation and deflation of the inflatable structure 2110 to define a bumper surface that moves longitudinally between the retracted position and the extended position of the extendable bumper system. In the illustrated example, the extendable bumper system includes two fascia panels 2183 that are each pivotally connected to the body portion 2104 at their top and bottom, respectively. Thus, the fascia panels 2183 pivot outward as the inflatable structure 2110 inflates and the fascia panels 2183 pivot inward as the inflatable structure 2110 deflates.

The inflatable structure 2110 is inflated in order to move the extendable bumper system 2106 to the extended position from the retracted position. To inflate the inflatable structure 2110, compressed gas is supplied to the inflatable structure from the compressor 2124 through the valve assembly 2118 and the pneumatic line 2120. Inflation of the inflatable structure 2110 can be performed in response to control signals received at the valve assembly 2118 and the compressor 2124 from the electronic control unit 2122, as explained with respect to the electronic control unit 122.

The inflatable structure 2110 is deflated in order to move the extendable bumper system 2106 to the retracted position from the extended position. As one example, the valve assembly 2118 can vent the pressurized gas in the inflatable structure 2110 to atmosphere in response to control signals from the electronic control unit 2122, while the elastic material of the inflatable structure 2110 contracts, which expels the pressurized gas from the interior of the inflatable structure 2110. As another example, the compressor 2124 can be used to evacuate the interior of the inflatable structure 2110.

FIGS. 41-44 show a portion of a vehicle 2200 having a vehicle structure 2202, a body portion 2204, and an extendable bumper system 2206. The extendable bumper system 2206 includes a moveable bumper 2262 and that is movably connected to the vehicle structure 2202. One or more levers 2263, such as two levers in the illustrated implementation, interconnect the moveable bumper 2262 and the body portion 2204. The levers 2263 can be pivotally connected to the moveable bumper 2262 and the body portion 2204, and are rotatable around central pivot points 2284 that also allows sliding motion relative to the body portion 2204. Interconnection of the moveable bumper 2262 and the body portion 2204 allows forward and rearward motion of the moveable bumper 2262 and the body portion 2204 in dependence upon rotation of the levers 2263. Forward and rearward sliding of the central pivot point 2284 may cause uniform frontward or rearward sliding of the moveable bumper 2262 and the body portion 2204.

Figure 41:
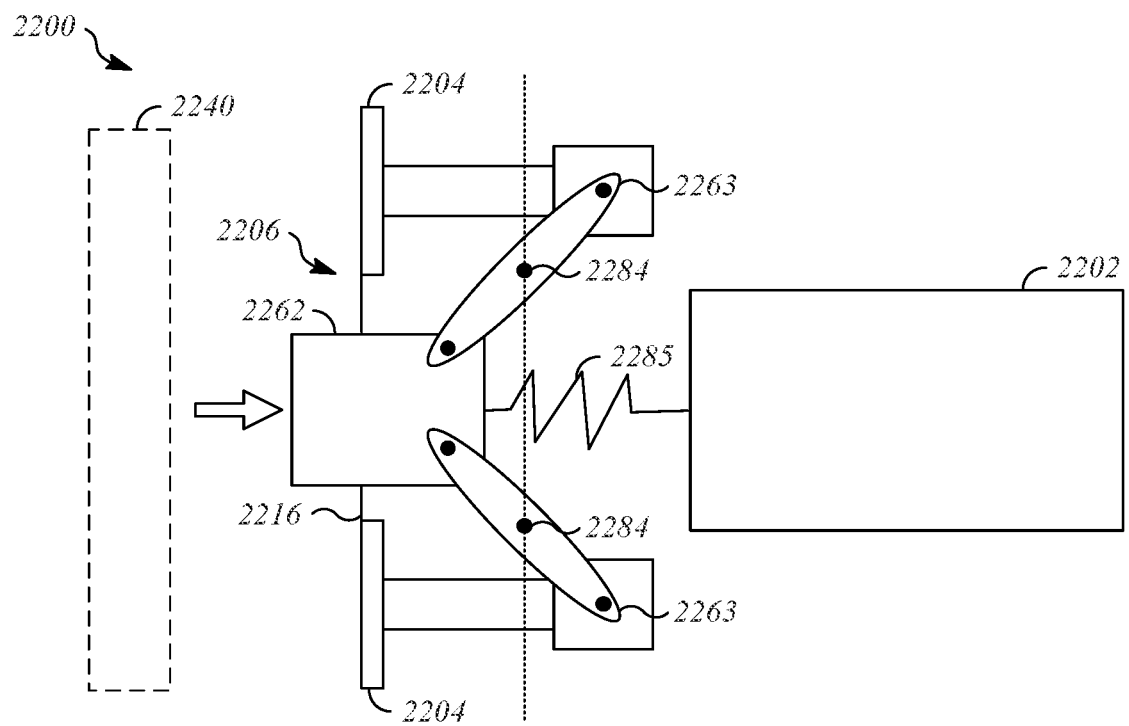
FIG. 41 is a side view illustration showing a portion of a vehicle including an extendable bumper system according to a twenty-second example in an extended position.
Figure 42:
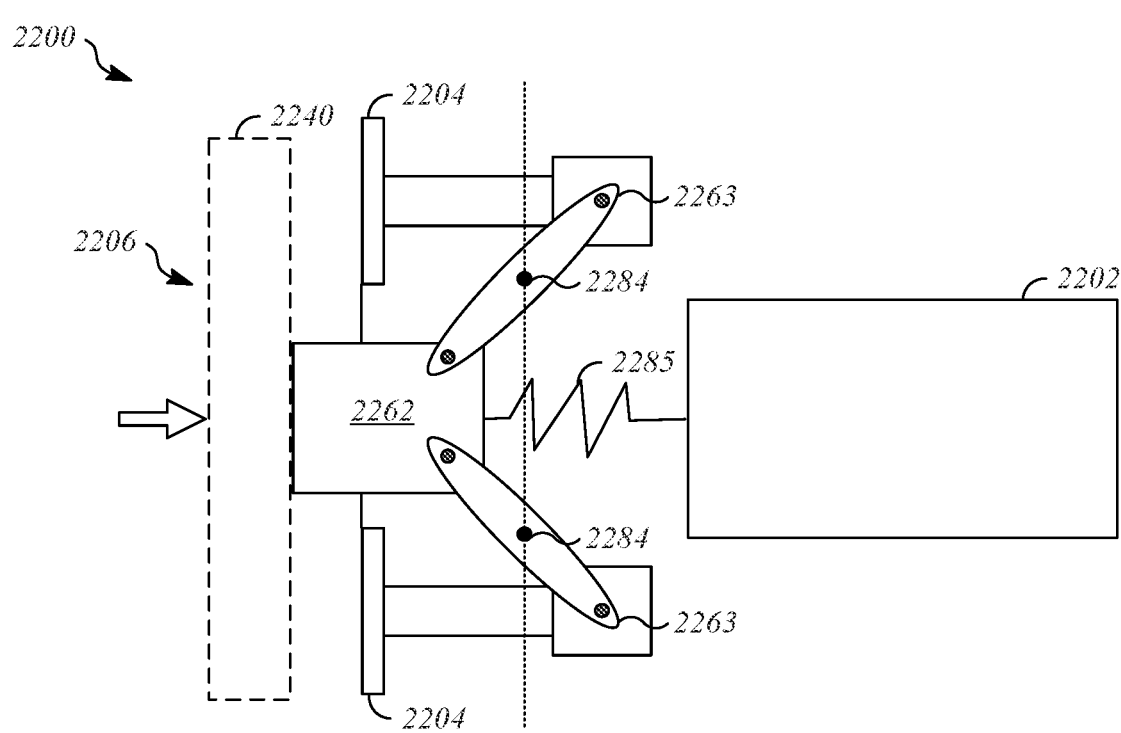
FIG. 42 is a side view illustration showing a portion of a vehicle including the extendable bumper system according to the twenty-second example in a first intermediate position.
Figure 43:
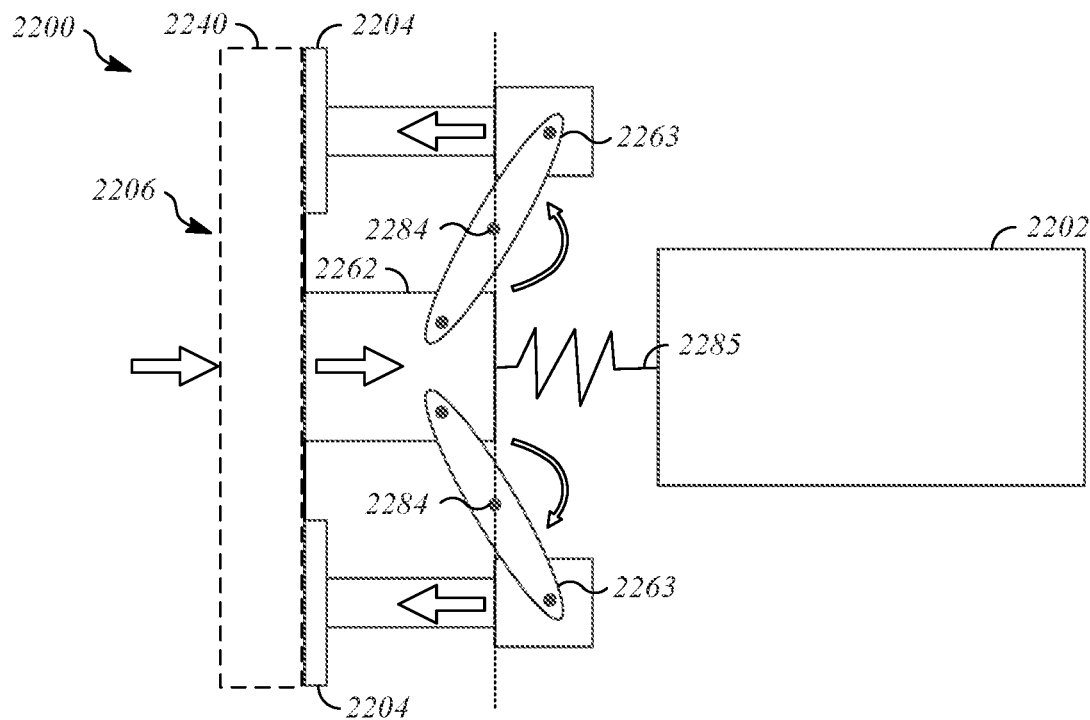
FIG. 43 is a side view illustration showing a portion of a vehicle including the extendable bumper system according to a twenty-second example in a second intermediate position.
Figure 44:
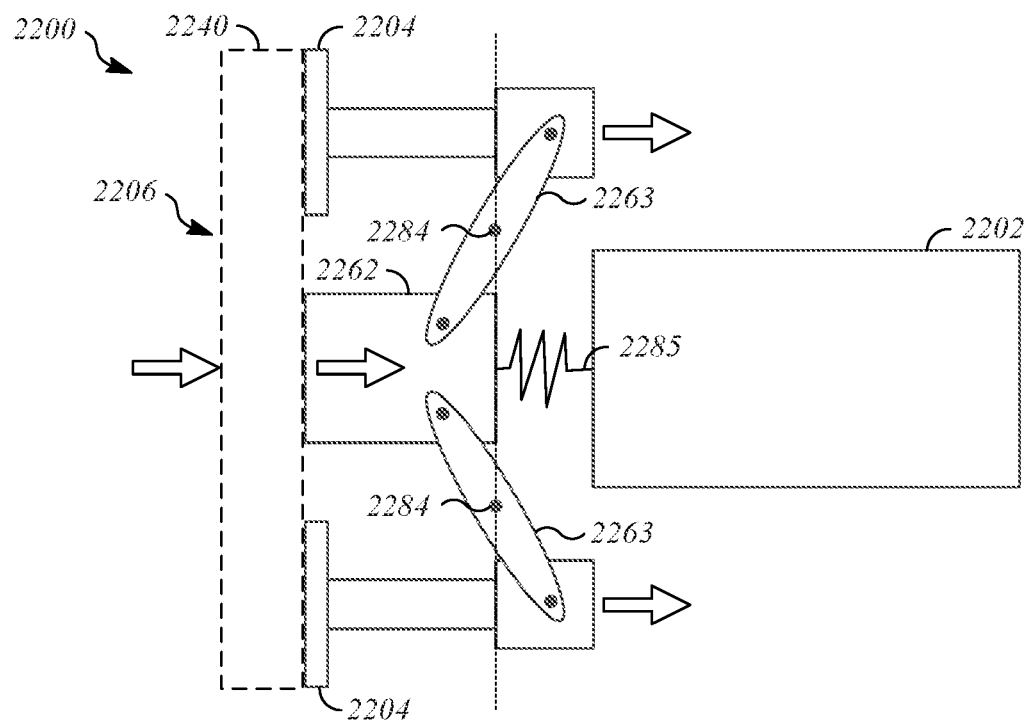
FIG. 44 is a side view illustration showing a portion of a vehicle including the extendable bumper system according to the twenty-second example in a retracted position.

In FIG. 41, the extendable bumper system 2206 is in an extended position in which the moveable bumper 2262 is located forward of the body portion 2204 and extends out of an opening 2216 formed by the body portion 2204. In FIG. 42, an object 2240 is in engagement with the moveable bumper 2262 but is not in engagement with the body portion 2204, which causes rearward motion of moveable bumper 2262. In FIG. 43, the moveable bumper 2262 has moved rearward, causing rotation of the levers 2263, which in turn cause forward motion of the body portion 2204 until the body portion 2204 engages the object 2240 to define a large contact area relative to the object 2240. Further engagement of the object 2240 with the moveable bumper 2262 and the body portion 2204 causes uniform rearward motion of the moveable bumper 2262, the body portion 2204, the levers 2263 and the central pivot points 2284 toward the vehicle structure 2202 against a force applied by a resilient biasing element such as a compression spring 2285, as shown in FIG. 44.

What is claimed is:

1. A vehicle, comprising:
a vehicle structure; and
an extendable bumper system that is connected to the vehicle structure and includes a first portion, a second portion, an actuator, and a cam, wherein the actuator is configured to move the cam and correspondingly move the extendable bumper system between a retracted position and an extended position, and wherein the cam is configured to engage and flex the first portion outward relative to the second portion during movement of the extendable bumper system from the retracted position to the extended position.

2. The vehicle of claim 1, wherein the first portion and the second portion are located on a fascia.

3. The vehicle of claim 2, wherein the fascia flexes during movement of the extendable bumper system from the retracted position to the extended position so that the first portion is flexed outward relative to a nominal position of the first portion during movement of the extendable bumper system from the retracted position to the extended position.

4. The vehicle of claim 3, wherein the actuator is configured to move the cam to flex the fascia during movement of the extendable bumper system from the retracted position to the extended position.

5. The vehicle of claim 2, wherein the fascia is flexible.

6. The vehicle of claim 1, wherein the cam is rotated by the actuator during movement of the extendable bumper system from the retracted position to the extended position.

7. The vehicle of claim 1, wherein the actuator is a linear actuator.

8. A vehicle comprising:
a vehicle structure;
an actuator;
a flexible fascia that is moved, by the actuator, between a retracted position and an extended position by flexing relative to a nominal position; and
a cam that is moved by the actuator to flex the flexible fascia during movement of the flexible fascia from the retracted position to the extended position.

9. The vehicle of claim 8, wherein a first portion of the flexible fascia is moved outward relative to a second portion of the flexible fascia during movement from the retracted position to the extended position.

10. The vehicle of claim 8,
wherein the cam is rotated by the actuator to flex the flexible fascia during movement of the flexible fascia from the retracted position to the extended position.

11. A vehicle comprising:
a vehicle frame;
a body portion coupled to the vehicle frame and including a surface; and
a movable panel coupled to the vehicle frame and movable between a first position and a second position; and
a cam configured to flex the movable panel between the first position and the second position,
wherein in the first position the movable panel is disposed away from the surface and in the second position the movable panel is located adjacent to the surface.

12. The vehicle of claim 11, further comprising an actuator configured to move the cam to move the movable panel relative to the surface of the body portion.

13. The vehicle of claim 11, wherein the movable panel is configured to flex between the first position and the second position.

\* \* \* \* \*